(12) United States Patent
Vanderveen et al.

(10) Patent No.: US 11,533,229 B2
(45) Date of Patent: Dec. 20, 2022

(54) METHOD AND SYSTEM FOR SIGNALING COMMUNICATION CONFIGURATION FOR IOT DEVICES USING MANUFACTURER USAGE DESCRIPTION FILES

(71) Applicant: BlackBerry Limited, Waterloo (CA)

(72) Inventors: Michaela Vanderveen, Tracy, CA (US); Stephen John Barrett, Haywards Heath (GB)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 16/880,252

(22) Filed: May 21, 2020

(65) Prior Publication Data
US 2021/0367839 A1    Nov. 25, 2021

(51) Int. Cl.
*H04L 41/084* (2022.01)
*H04L 12/66* (2006.01)
*H04L 67/146* (2022.01)

(52) U.S. Cl.
CPC ............ *H04L 41/084* (2013.01); *H04L 12/66* (2013.01); *H04L 67/146* (2013.01)

(58) Field of Classification Search
CPC ...... H04L 41/084; H04L 12/66; H04L 67/146
USPC ......................................................... 709/220
See application file for complete search history.

(56) References Cited

U.S. PATENT DOCUMENTS

| | | | |
|---|---|---|---|
| 8,149,262 B2* | 4/2012 | Tucker ............... | H04L 12/1827 348/14.09 |
| 9,836,386 B2* | 12/2017 | Vecera ............... | G06F 11/3664 |
| 10,298,581 B2* | 5/2019 | Shah ................... | H04L 63/20 |
| 10,489,669 B2* | 11/2019 | Arnold ............... | G06T 7/13 |
| 10,581,690 B2* | 3/2020 | Salgueiro ........... | H04W 4/50 |
| 10,601,664 B2* | 3/2020 | Kumar ............... | H04W 12/102 |
| 10,841,164 B2* | 11/2020 | Kampanakis ....... | H04L 43/08 |
| 10,897,475 B2* | 1/2021 | Clarke ................ | H04L 63/20 |
| 10,972,980 B2* | 4/2021 | Cariou ............... | H04W 52/0229 |
| 11,190,634 B2* | 11/2021 | Youst ................. | H04M 1/72448 |
| 2009/0005068 A1* | 1/2009 | Forstall ............... | H04L 67/18 455/456.1 |
| 2009/0170532 A1* | 7/2009 | Lee .................... | H04M 1/72451 455/456.3 |
| 2014/0378089 A1* | 12/2014 | Monros .............. | H04W 4/90 455/404.1 |

(Continued)

OTHER PUBLICATIONS

Garcia et al., Enforcing Behavioral Profiles through Software-Defined Networks in the Industrial Internet of Things, Applied Sciences, 1-21, (Oct. 2019) (Year: 2019).*

(Continued)

*Primary Examiner* — David P Zarka
(74) *Attorney, Agent, or Firm* — Moffat & Co

(57) ABSTRACT

A method at a network element for configuration for Internet of Things (IoT) devices using manufacturer usage description (MUD) files, the method including receiving at least one MUD Uniform Resource Locator (URL) from an IoT Device; sending, from the network element to at least one MUD Server based on the MUD URL, a Uniform Resource Indicator; responsive to the sending, receiving a plurality of MUD files from the MUD server; creating a plurality of policies from the plurality of MUD files, the plurality of policies corresponding to a normal mode of operation and a secondary mode of operation; and forwarding the plurality of policies to a gateway from the network element.

15 Claims, 15 Drawing Sheets

(56) References Cited

U.S. PATENT DOCUMENTS

| | | | | |
|---|---|---|---|---|
| 2019/0236493 | A1* | 8/2019 | Cam-Winget | H04L 63/1425 |
| 2019/0319953 | A1* | 10/2019 | Lear | H04L 63/0823 |
| 2020/0076708 | A1* | 3/2020 | Kloberdans | H04L 61/5061 |
| 2020/0092254 | A1* | 3/2020 | Goeringer | H04L 45/64 |
| 2020/0137119 | A1* | 4/2020 | Jin | H04L 63/107 |
| 2020/0162517 | A1* | 5/2020 | Wong | H04W 12/12 |
| 2020/0177485 | A1* | 6/2020 | Shurtleff | H04L 67/22 |

OTHER PUBLICATIONS

Ranganathan et al., Soft MUD, Implementing manufacturer usage descriptions on openflow sdn switches, National Institute of Standardsand Technology, pp. 1-6, 2019 (Year: 2019).*

International Standards Organization/International Electrotechnical Commission ISO/IEC JTC1/SC 41 30141 "Information technology—Internet of Things Reference Architecture (IoT RA)" May 2018.

Enisa, "Baseline Security Recommendations for IoT in the context of Critical Information Infrastructures" Nov. 2017.

U.S. Department of Homeland Security, "Strategic principles for securing IoT" Nov. 2016.

TDSI, "TSDSI STD T1.oneM2M TR-0001-2.4.1 V1.0.0 Use Cases Collection" Sep. 2017.

ETSI Technical Report (TR) 103 582 V1.1.1 "EMTEL; Study of use cases and communications involving IoT devices in provision of emergency situations" Jul. 2019.

IETF Request for Comments 8520 "Manufacturer Usage Description Specification" Mar. 2019.

NIST Special Publication 1800-15B, "Securing Small-Business and Home Internet of Things (IoT) Devices Mitigating Network-Based Attacks Using Manufacturer Usage Description (MUD)" Nov. 2019.

Anima Working Group of IETF, "Bootstrapping Remote Secure Key Infrastructures (BRSKI) draft-ietf-anima-bootstrapping-keyinfra-39," Mar. 27, 2020.

ETSI TS 123 003 V14.3.0, "Digital cellular telecommunications system (Phase 2+) (GSM); Universal Mobile Telecommunications System (UMTS); Numbering, addressing and identification" May 2017.

IEEE Standards Association 802.1AR, "IEEE Standard for Local and Metropolitan Area Networks—Secure Device Identity", 2018.

* cited by examiner

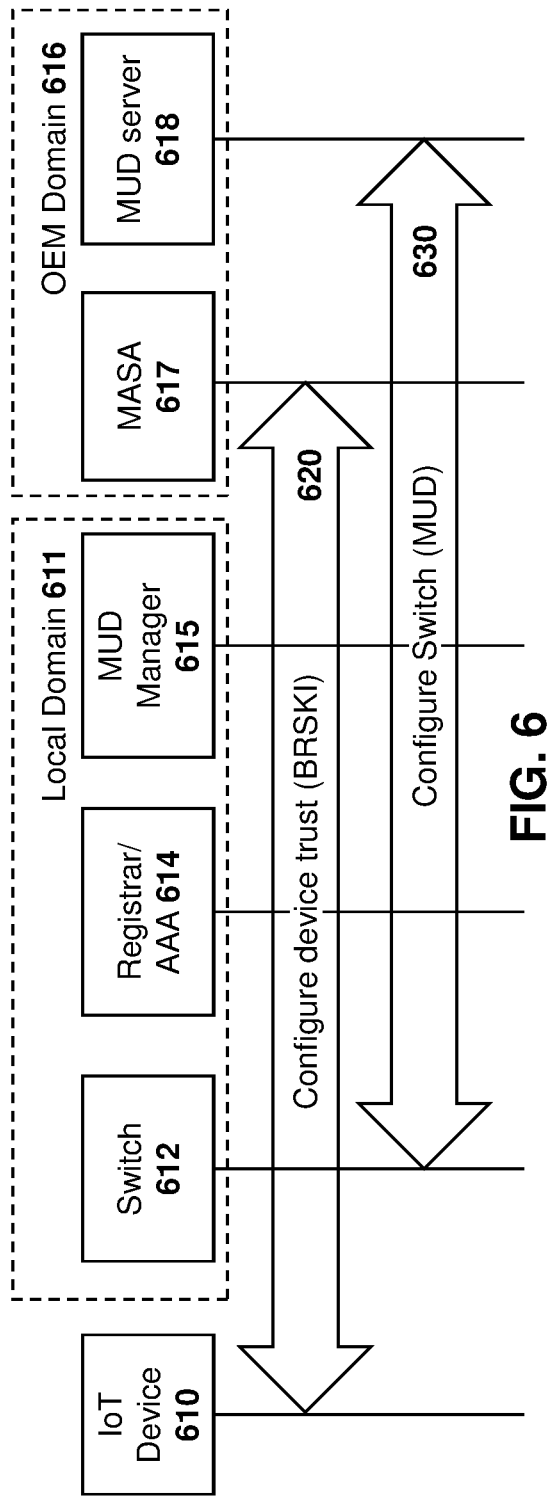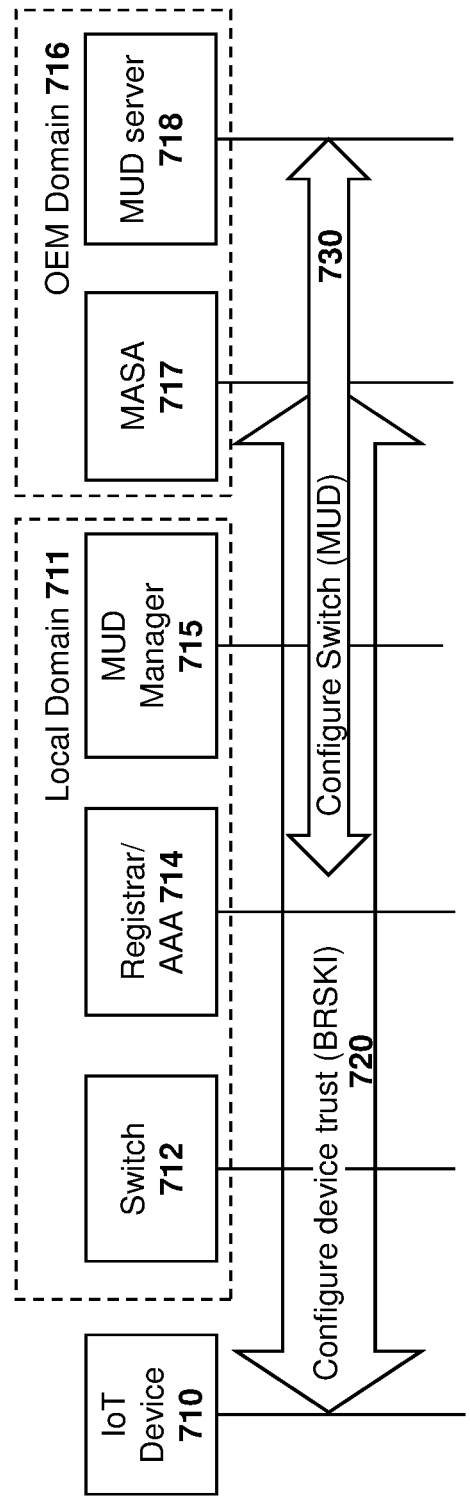

METHOD AND SYSTEM FOR SIGNALING COMMUNICATION CONFIGURATION FOR IOT DEVICES USING MANUFACTURER USAGE DESCRIPTION FILES

FIELD OF THE DISCLOSURE

The present disclosure relates emergency service response, and in particular relates to the provision of supplementary data to emergency service providers.

BACKGROUND

Some Internet of Things (IoT) devices provide information that must be made continuously available to emergency services. Examples of such devices include smoke or fire alarms that may provide information immediately to the fire services or a burglar alarm or intrusion detection system that may provide information immediately to a police force, among others. Such devices are termed herein as "Class 1" devices.

However, other types of IoT devices are not used for the purposes of indicating the onset of a safety or security event, but may provide useful functionality in the handling of an emergency event. Examples may include, among others, light bulbs that can tell firefighters whether the building is illuminated or thermometers which may be able to tell the fire services about the way a fire is spreading. Other cases include actuators that may control doors that are used for safety (fire doors) or for security, which only allow authorized people to enter or exit. Such IoT devices are termed herein as "Class 2" IoT devices.

Class 2 IoT devices are typically connected to communication networks and cloud-based applications, but typically do not include a functionality that is made available to emergency services.

BRIEF DESCRIPTION OF THE DRAWINGS

The present disclosure will be better understood with reference to the drawings, in which:

FIG. 6 is a block diagram showing an example of utilizing MUD and BRSKI sequentially;

FIG. 7 is a block diagram showing an example of utilizing MUD and BRSKI simultaneously;

DETAILED DESCRIPTION OF THE DRAWINGS

Figure 1:
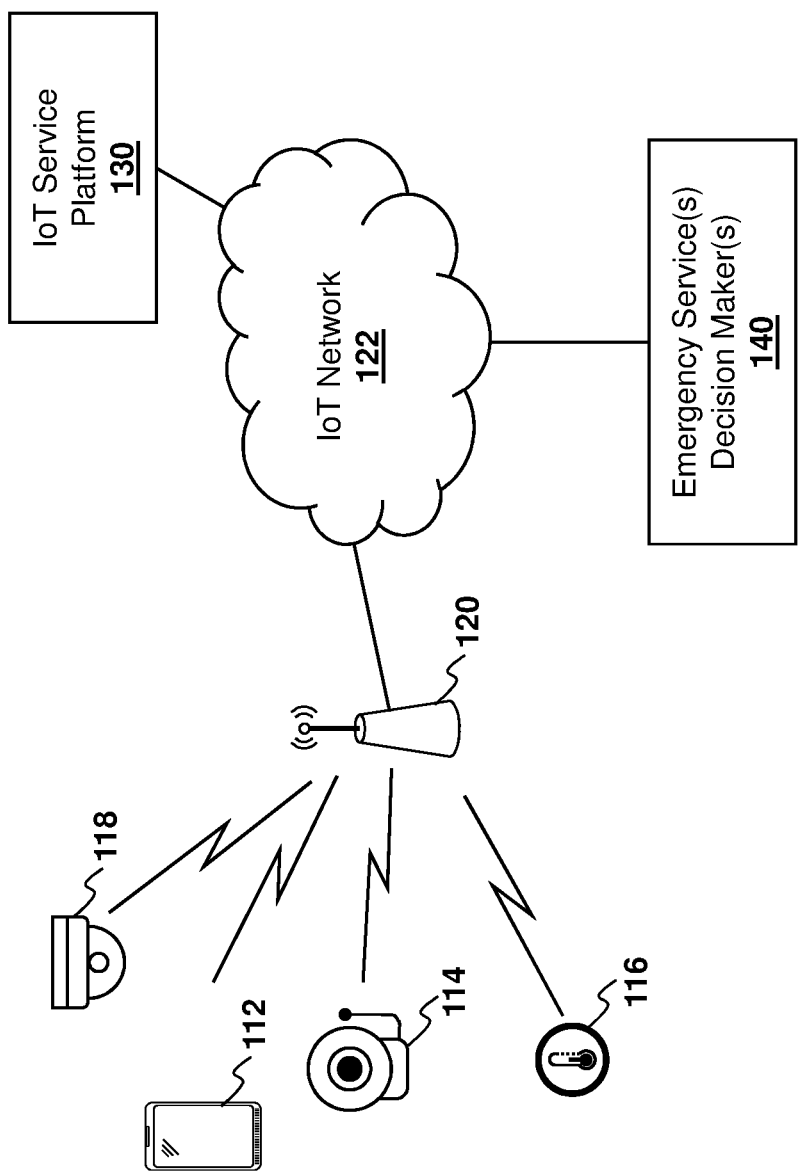
FIG. 1 is a block diagram showing an example Internet of Things communication architecture.

The present disclosure provides a method at a network element for configuration for Internet of Things (IoT) devices using manufacturer usage description (MUD) files, the method comprising: receiving at least one MUD Uniform Resource Locator (URL) from an IoT Device; sending, from the network element to at least one MUD Server based on the MUD URL, a Uniform Resource Indicator; responsive to the sending, receiving a plurality of MUD files from the MUD server; creating a plurality of policies from the plurality of MUD files, the plurality of policies corresponding to a normal mode of operation and a secondary mode of operation; and forwarding the plurality of policies to a gateway from the network element.

The present disclosure further provides a network element for configuration for Internet of Things (IoT) devices using manufacturer usage description (MUD) files, the network element comprising: a processor; and a communications subsystem, wherein the network element is configured to: receive at least one MUD Uniform Resource Locator (URL) from an IoT Device; send to at least one MUD Server based on the MUD URL a Uniform Resource Indicator; responsive to sending the Uniform Resource Indicator, receive a plurality of MUD files from the MUD server; create a plurality of policies from the plurality of MUD files, the plurality of policies corresponding to a normal mode of operation and a secondary mode of operation; and forward the plurality of policies to a gateway from the network element.

The present disclosure further provides a computer readable medium for storing instruction code for configuration for Internet of Things (IoT) devices using manufacturer usage description (MUD) files, which when executed by a processor of a network element cause the network element to: receive at least one MUD Uniform Resource Locator (URL) from an IoT Device; send to at least one MUD Server based on the MUD URL a Uniform Resource Indicator; responsive to sending the Uniform Resource Indicator, receive a plurality of MUD files from the MUD server; create a plurality of policies from the plurality of MUD files, the plurality of policies corresponding to a normal mode of operation and a secondary mode of operation; and forward the plurality of policies to a gateway from the network element.

The present disclosure therefore provides embodiments to allow Class 2 IoT devices to be able to directly communicate with emergency services during an emergency event. In accordance with the present disclosure, "direct communication" implies Internet Protocol (IP) level routing between Class 2 IoT devices and emergency services servers or devices, that bypasses regular ("normal mode of operation") communications servers and/or gateways.

As described below, one option for communications would be through an emergency clearinghouse. However, the clearinghouse server may be physically located far from the actual emergency and needs to rely on accurate location information to be able to distribute the data to an appropriate emergency response system. It is also a single point of failure.

Further, in some cases, requirements and/or architecture designs may be imposed that IoT devices need to call emergency services servers or Public Safety Access Points (PSAPs) directly. Specifically, it may be desirable to minimize processing load and delays at the application server side, which has to receive data and send it to the emergency services.

Furthermore, a cybersecurity requirement may exist for the such Class 2 devices, which may be a requirement for "need-based communication". In particular, "need-based communication" implies that such direct communication should be precluded during normal operation but allowed during an emergency and disallowed once the emergency ends. This may be done in order to minimize security concerns including an attacker attempting to extract IoT device data in an unauthorized fashion, for example by impersonating or spoofing an emergency services server. This may be further done to avoid attackers attempting to take control of IoT devices and use them to mount a (Distributed) Denial of Service ((D)DoS) attack against a local emergency service server or PSAP.

Constraining communication is typically done via firewall rules that are instantiated on network nodes such as gateways. A permanently open "pinhole" allowing communication with the emergency services at all times would constitute an additional attack vector.

Therefore, in accordance with the embodiments of the present disclosure, methods and systems are provided to enable need-based, direct communications between Class 2 IoT devices, such as sensors and actuators, and a (local) emergency service during an emergency event. To do this, an IoT device can be designed or configured to operate differently in the case of an emergency, for example by changing communication end points or protocols, or changing the access control policy in force at the device or its gateway to allow access to its collected data by first responders or similar entities, or to take commands from first responders or similar entities.

Example Device Use in Emergency Communication

IoT devices are deployed in many verticals, including but not limited to, smart buildings or homes, utilities, healthcare, in vehicles, among other examples. Such IoT devices communicate by taking input from, or sending information to, another node in the network.

An IoT device's behavior and pattern of communication may change to adapt to the case of abnormal conditions in the area where it is deployed. For example, such abnormal condition may be an emergency or a disaster situation.

The International Standards Organization/International Electrotechnical Commission (ISO/IEC) has a reference IoT architecture defined in IEC ISO/IEC JTC1/SC 41 30141 "*Information technology—Internet of Things Reference Architecture (IoTRA)*". This architecture contains a use case for an emergency situation in a building, where the doors are unlocked without further access control. For example, this architecture specifies:

"In cases of an emergency like a fire, the arrival of the fire service requires that the doors to a building be unlocked. The security policy that governs the doors' access can be enhanced with context. The context here is that the building is currently experiencing an emergency situation and that the emergency services are in the vicinity. Based on these two contextual inputs the policy could enable the system to unlock the door automatically and provide access without the need for further authorization."

Other examples exist to define the behavior of IoT devices in different contexts.

In a first example, the European Network and Information Security Agency (ENISA), in their document "*Baseline Security Recommendations for IoT in the context of Critical Information Infrastructures*", November 2017, recommends to "[GP-TM-30]: Ensure a context-based security and privacy that reflects different levels of importance (e.g. emergency crisis, home automation)". One interpretation is that the security/privacy characteristics should be different for an emergency state vs. normal state.

In a second example, the US Department of Homeland Security, in their "*Strategic principles for securing IoT*", November 2016 document, recommend to "Build in controls to allow manufacturers, service providers, and consumers to disable network connections or specific ports when needed or desired to enable selective connectivity." One way to interpret the selective connectivity enablement could be that when telemetry data exceeds a certain threshold, it can be assumed to be in an incident, and so it can attempt to connect to/accept incoming connections from other entities (e.g. peers) not normally allowed.

In a third example, one M2M in their TR-0001 V2.4.1, "*Use Cases Collection*" document, include several scenarios where the behavior of IoT devices is altered upon an emergency situation. A first concerns Enterprise: Smart Building, in which, when an emergency situation occurs, devices behave differently e.g. doors unlock, sirens are triggered, etc. A second involves Healthcare: Secure remote patient care and monitoring, in which, when an emergency situation occurs, emergency responders can be called upon. A third concerns Public services: Street light automation, where the luminosity of a streetlamp can be changed when an emergency vehicle is detected to be within a certain proximity e.g. via a proximity sensor, from a server, from other street furniture (e.g. traffic lights).

In a fourth example, the European Telecommunications Standards Institute (ETSI) provides a document TR-103 582, "*EMTEL; Study of use cases and communications involving IoT devices in provision of emergency situations*", July 2019. This document contains several scenarios with IoT in emergency situations. In a first scenario, an IoT device may make a direct emergency call. In a second scenario, an IoT service platform operator may make an emergency call based on the data it receives from the IoT device. Such call may include additional data from the device. In a third scenario, emergency services teams may access pre-deployed IoT devices that they do not normally have access to. Potential conflict is flagged as two entities (building management and emergency teams) both have access to a device, at the service level (not the network/ transport level). This third scenario points to a change in access control policy.

Clearinghouse

In one use case, emergency service teams may access pre-deployed IoT devices control or data. An emergency service team may comprise members managing and coordinating the emergency service operations, and may include members of an emergency mission in or near the incident area. Examples include first responders such as fire crew, police officers, technical and medical staff, among others. For example, reference is now made to FIG. 1. In the embodiment of FIG. 1, IoT devices such as a mobile phone 112, an alarm system 114, a temperature monitoring system 116, a video camera 118, among other options for IoT devices may communicate through an access point 120 with an IoT network 122. The IoT network 122 can be a long-range or short-range wireless network or a wired network. In this case, the IoT service platform 130, along with the IoT devices, may be pre-deployed to communicate with an emergency services decision-maker 140. Thus, in an emergency in a private or public building or in an area with a pre-deployed IoT based safety system, IoT devices and the building safety system can provide additional helpful information to emergency service teams.

As used herein, a clearinghouse is a standards compliant Location Information Server (LIS) and an Additional Data Repository (ADR) that is accessible to emergency personnel through a portal or through integration with a PSAP's existing equipment and software. One example of such clearinghouse is the RapidSOS Clearinghouse, as for example described in RapidSOS—Karen Marquez *"Rapid-SOS Clearinghouse"*, April 2019.

Further, an IoT service platform is an intelligent layer between applications, networks and IoT devices. It is a coherent set of standardized functionalities. An IoT service platform is considered as an enabler for communication and data interoperability, as provided in ETSI TR 103 582. In some cases, the IoT service platform can include an IoT App server.

Manufacturer Usage Description

A Manufacturer Usage Description (MUD) system consists of an architecture and data format defined by the Internet Engineering Task Force (IETF) that allows and places responsibilities on IoT device makers to specify the intended communication patterns for their devices when such devices connect to a network. For example, this architecture and data format is defined in IETF RFC 8520, *"Manufacturer Usage Description Specification"*, March 2019. A network where such a device is made part of can then use this intent to write an access policy for the network's context, and thus enforce how the device functions. This mechanism is expected to reduce security incidents related to communication, protecting the device from external threats, rather than trying to protect the network from the device.

An IoT device is expected to have a very small number of uses, and so it should have a small number of communication patterns. Thus, by providing an intent, the approach is traceable/scalable. Further, it is assumed that the manufacturer is in the best position to say what is normal communication that should be allowed for the device, assuming any other pattern of communication is to be disallowed.

A network administrator may then be able to write a local policy based on a MUD file utilizing a logical entity entitled a "MUD manager". The MUD manager is a tool and functional block that acts under the direction of the system administrator. The MUD manager may query the administrator for permission to add an Internet of Things "thing" and associated policy that should be applied to this device. Therefore, the MUD manager is a logical component. Physically, the functionality that the MUD manager provides can and often is combined with that of the network router in a single network device.

As used herein, a "policy" includes rules that govern the management of a network of nodes, encompassing treatment (e.g., allowed or dropped) of traffic to and from entities inside or outside that network. In the context of MUD, the switch/router implements an IP access-control-list-based policy using DNS names. Such policy is not the MUD file. The policy is "written" by the local deployment network (or IoT service platform) based on the information in the retrieved MUD file.

According to IETF RFC 8520, MUD consists of three architectural building blocks. A first is a Uniform Resource Locator (URL) that can be used to locate a description file. A second is the description itself, including how it is to be interpreted. A third is a means for local network management systems to retrieve the description.

The URL serves both to classify the device type, for example in the case where the decision to allow a device to join the local network is based on the device type and not a unique device identifier, and to provide a means to locate an access rules description file. The manufacturer or type itself may be indicated simply by the authority component, such as the domain name, of the MUD URL. The MUD URL can be sent or "emitted" by the thing (IoT device) in at least three ways. In a first way, the MUD URL can be sent via the Dynamic Host Configuration Protocol (DHCP) in a DHCP Option. In a second way, the MUD URL can be sent via a Link Layer Discovery Protocol (LLDP). In a third way, the MUD URL may be sent via a message using the IEEE 802.1AR or 802.1X standard to embed the MUD URL in an X.509 certificate extension, for example for IEEE 802.1X authentication messages.

MUD access rules in the MUD file description defined by the manufacturer can cover various scenarios, including but not limited to, communicating through the cloud, for example, to a given application server in the IoT service platform in one case. In another case, the MUD file may include rules for communicating to other devices of the same manufacturer within the local deployment. Other options are possible.

Specific protocols and port numbers can also be specified for each of these communications. The focus is on network access control. However, these rules can be expanded to other areas including quality of service.

Figure 2:
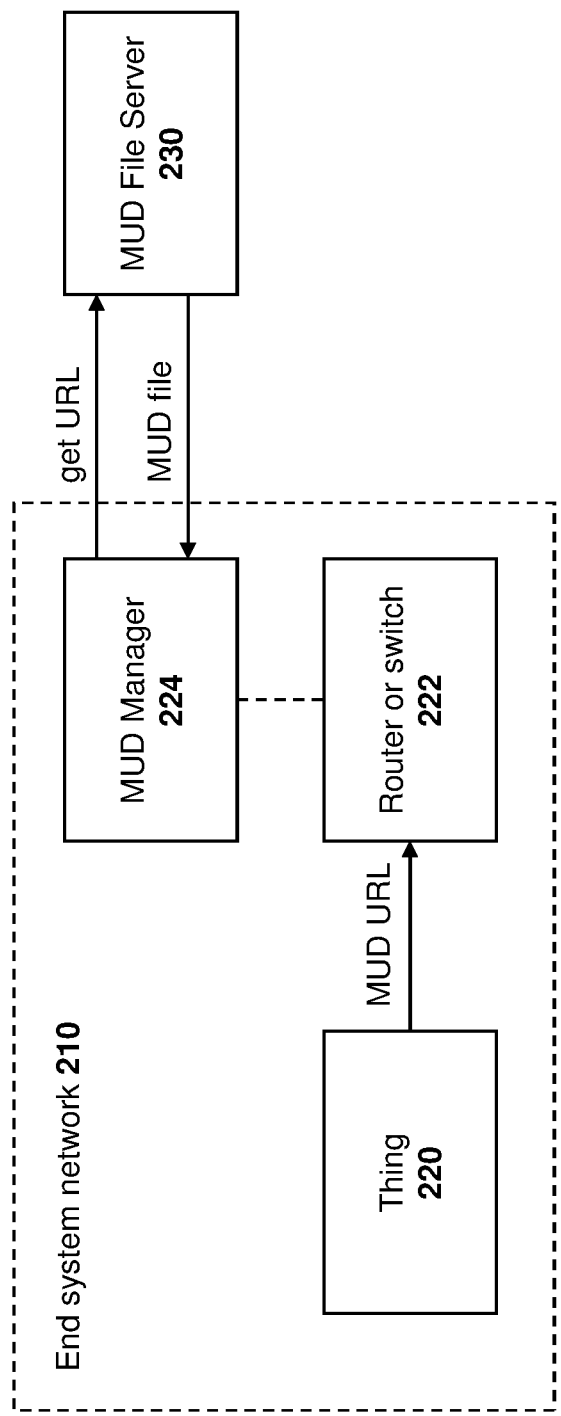
FIG. 2 is a block diagram showing an example Manufacturer Usage Description (MUD) architecture.

Reference is now made to FIG. 2, which shows an example MUD architecture as in IETF RFC 8520. In the example of FIG. 2, the MUD architecture and format allow for automating the definition of a network access policy based on the MUD profile defined by the manufacturer. Methods to instantiate these profiles depend on the network domain where the device is deployed.

In the specification, the MUD file format uses the Yet Another Next Generation (YANG) for format and JavaScript Object Notation (JSON) for serialization.

A translation approach between the Access Control Lists (ACL) in the MUD file and the local policy ready for a router/switch/gateway to enforce is not specified in the IETF RFC. Examples of access control entries in a policy include firewall rules, flow rules, among others. These rules are to limit the traffic between the device (Thing) and external domains or between the device (Thing) and other devices in the Local Network.

Thus, in the example of FIG. 2, an End System Network 210 (or local IoT deployment network) includes the Thing 220. The Thing 220 emits a URL, for example as described above. The URL can be configured in the Thing 220 (or IoT device) by the device manufacturer.

A router or switch 222 extracts from the protocol frame a URL. The URL is then forwarded to MUD manager 224.

The MUD manager 224 retrieves the MUD file and signature from the MUD File Server 230, assuming it does not already have a copy. MUD manager 224 validates the signature and tests the URL.

The MUD manager 224 may query an administrator for permission to add the Thing 220 and associated policy. If the Thing is known or the Thing type is known, the MUD manager 224 may skip this step.

The MUD manager 224 instantiates a local configuration based on the abstractions defined in the RFC.

The MUD manager 224 configures the switch nearest the Thing 220. Other systems may be configured as well.

When the Thing 220 disconnects, the policy may be removed.

In the example of FIG. 2, a human such as the administrator of a domain may be involved in reading the MUD file and writing the policy to be enforced at the network device.

Figure 3:
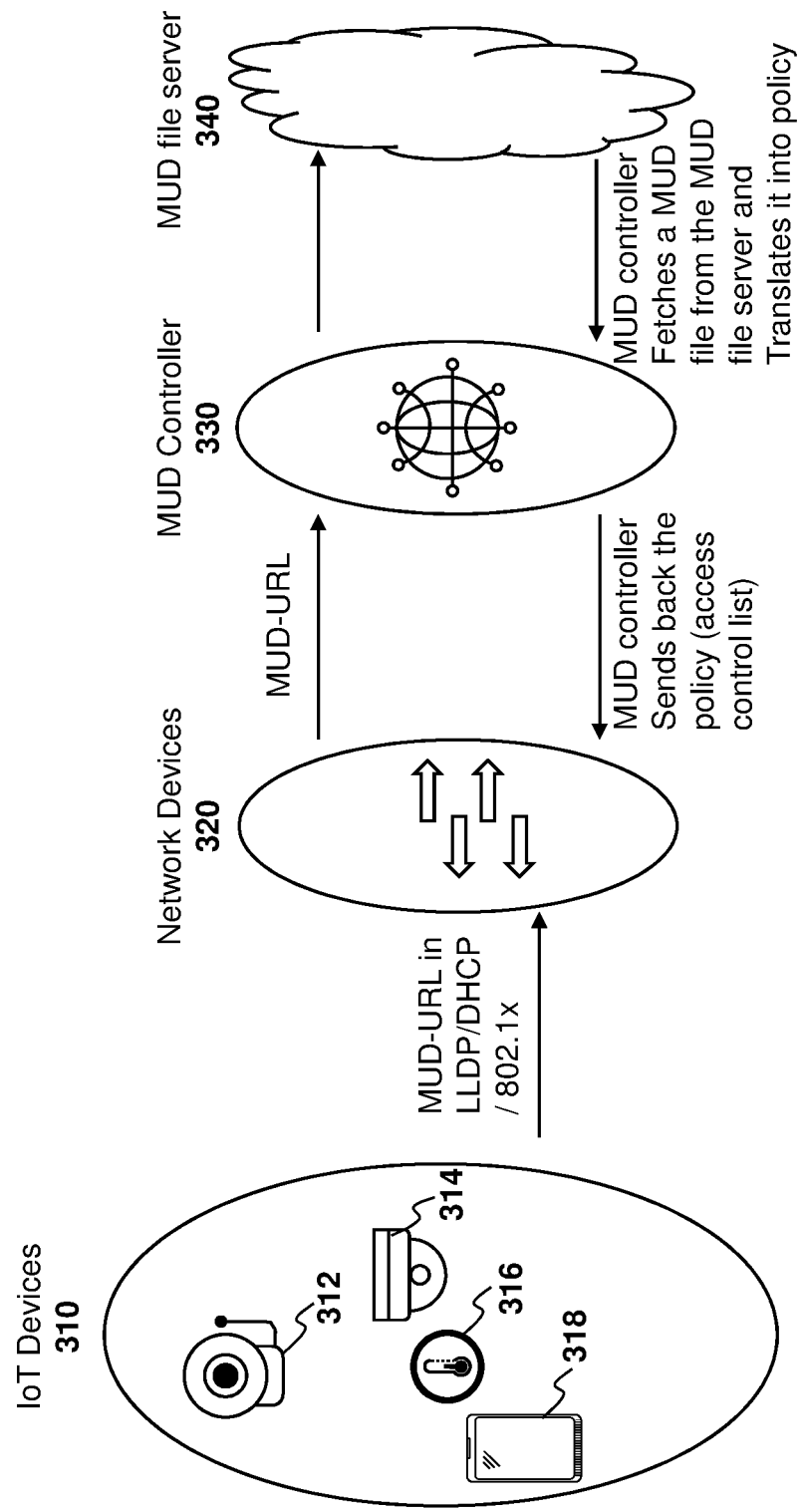
FIG. 3 is a dataflow diagram showing MUD Policy retrieval.

Similarly, FIG. 3 depicts MUD policy retrieval. In the example of FIG. 3, IoT devices 310 are shown to include an alarm 312, a camera 314, a thermostat 316 and a mobile device 318. However, these are merely provided as examples and other examples of IoT devices 310 are possible.

In an example implantation in the art, referring to FIG. 3, one of IoT devices 310 send a MUD URL to network devices 320, which may include routers, gateways or switches, among other options. The MUD URL is then forwarded to the MUD controller 330, which is the same as the MUD manager 224 from FIG. 2. The MUD controller 330 may then use the MUD File Server 340 to request and receive the policy files. In some cases, the MUD controller 330 may then send back a policy, such as an access control list, to network devices 320.

In another example, MUD may be used with certificates. This is a more secure way for a device to convey its configuration and MUD file location, but is more costly to implement as with any digital certificate that can come configured as part of an IoT device.

For example, an X.509 certificate that is embedded in the IoT device can have an extension such as "ext-MUDURL" to contain the URL that points to the online MUD description that is valid for the device holding the certificate. Another certificate extension may be defined as "ext-MUD-signer" to identify the server or subject field of the signing certificate of the MUD file.

For example, the National Institute of Standards and Technology (NIST) has outlined a proof of concept using off-the-shelf IoT and network boxes, called NIST-MUD to show the feasibility of MUD and published this as NIST SP 1800-15B "*Securing Small-Business and Home Internet of Things (IoT) Devices; Mitigating Network-Based Attacks Using Manufacturer Usage Description (MUD)*", November 2019. FIGS. 2.4-4 of this publication is shown with regard to FIG. 4 of the present disclosure.

Figure 4:
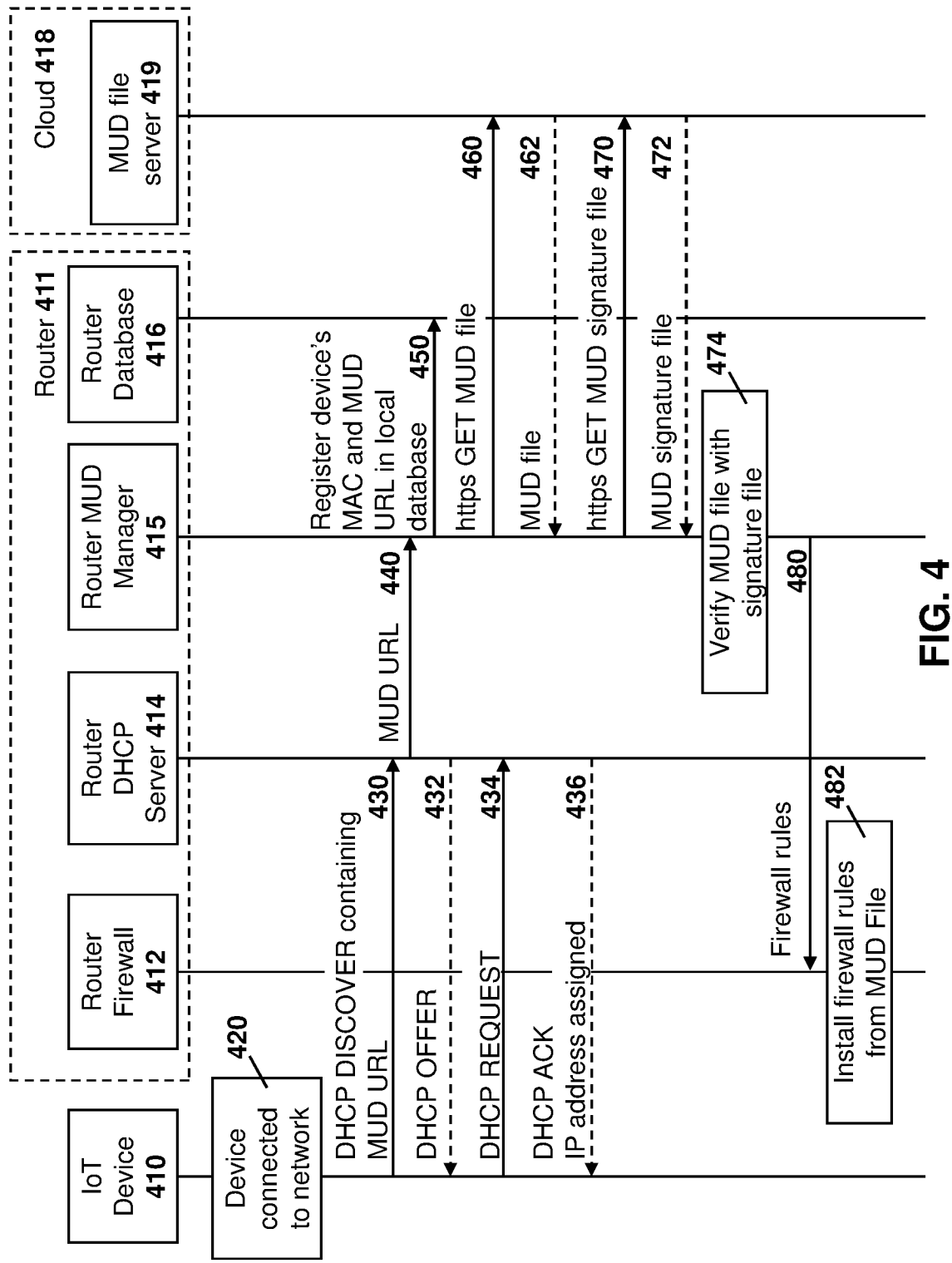
FIG. 4 is a dataflow diagram showing instantiation of a MUD system.

In the embodiment of FIG. 4, IoT Device 410 communicates with a router 411. Router 411 includes a router firewall 412, a router DHCP server 414, a router MUD manager 415, and a router database 416.

Further, the cloud 418 includes a MUD file server 419.

As shown at block 420, the device 410 is connected to a network (e.g., a wired or wireless network). Thereafter, a DHCP DISCOVER message 430 may be sent to the DHCP server 414. The DHCP DISCOVER message 430 includes a MUD URL.

The DHCP server 414 may send a DHCP OFFER message 432 back to the device 410. Further, device 410 may send a DHCP REQUEST message 434 to the router DHCP server 414 and the DHCP server 414 may send a DHCP ACK message 436 that includes an assigned IP address back to the IoT device 410.

After receiving the DHCP discover message 430, the router DHCP server 414 may send the MUD URL in message 440 to the router MUD manager 415. The router MUD manager 415 may then register the device's Medium Access Control (MAC) and MUD URL using message 450 to the router database 416.

Further, the router MUD manager 415 may send an https GET MUD file message 460 to the MUD file server 419.

In response, the MUD file server 419 may send the MUD file back to the router MUD manager 415 in message 462.

Thereafter, the router MUD manager 415 may send an https GET MUD signature file message 470 to the MUD file server 419 and in response receive the MUD signature file in message 472.

Once message 472 is received, the router MUD manager 415 may verify at the MUD file with the signature file at block 474. Assuming such verification is successful, then the router MUD manager 415 may send firewall rules in message 480 to the router firewall 412. The firewall rules are a set of policies based on the information in the MUD file.

Thereafter, the router firewall 412 may install firewall rules from the MUD file as shown at block 482.

Bootstrapping Remote Key Infrastructure (BRSKI)

The Automatic Networking Integrated Model and Approach (ANIMA) working group of the IETF is developing a standard around the Bootstrapping Remote Secure Key Infrastructure (BRSKI), namely the "*IETF Draft draft-ietf-anima-bootstrapping-keyinfra*-38: *Bootstrapping Remote Secure Key Infrastructures* (*BRSKI*)", March 2020. The BRSKI standard outlines means to automatically deploy identity to devices so that they can be authorized on the network and establish secure communications. This enables zero-touch provisioning of devices, suitable for industrial IoT and smart home scenarios.

Entities involved include the: Pledge (a term denoting device/client), Switch/router, Registrar (all in the local domain), Manufacturer with Manufacturer Authorized Signing Authority (MASA) and optional Ownership tracker in the Original Equipment Manufacturer (OEM) domain.

BRSKI requires an Authentication, Authorization and Accounting (AAA) infrastructure, which in some cases can be combined with the Registrar function. The security characteristics include the use of X.509 certificates and Transport Layer Security (TLS) during authentication and authorization involving all parties.

With BRSKI, a device asks for a voucher from its trusted manufacturer. The Registrar forwards that voucher request, obtains a voucher, and sends the voucher to the device for verification. The voucher is in a standardized format and contains claims made by the manufacturer about the device and the local deployment.

At the end of the procedure, the device trusts the local domain (or local IoT deployment network) and the local domain trusts the device.

Figure 5:
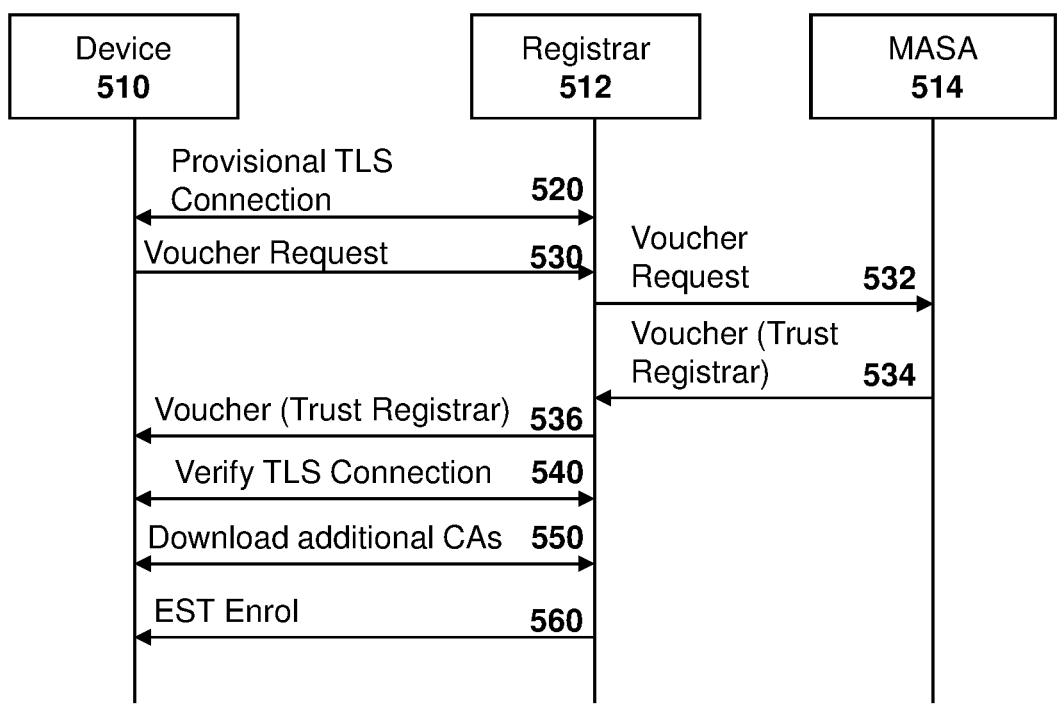
FIG. 5 is a dataflow diagram showing an example Bootstrapping Remote Key Infrastructure (BRSKI) message flow.

In particular, reference is now made to FIG. 5. In the example of FIG. 5, a device 510 may establish a provisional TLS connection 520 with the registrar 512.

The device 510 may send a voucher request 530 to registrar 512. Registrar 512 may then forward the voucher request in message 532 to the MASA 514.

The voucher may be then provided in message 534 back to registrar 512. Registrar 512 may then forward the voucher in message 536 back to device 510.

The process may then involve the verification of the TLS connection as shown by arrow 540 and the downloading of additional certificate authorities as shown by arrow 550.

At arrow 560, the enrolment is established using the protocol "Enrollment over Secure Transport", as defined by IETF RFC 7030.

Using BRSKI and MUD to Configure Device and Router

In some cases, it is possible to use both BRSKI and MUD to configure the device and the switch, one after the other. Reference is now made to FIG. 6. In the example of FIG. 6, an IoT device 610 communicates with a local domain 611 which includes a switch 612, a registrar/AAA 614 and a MUD manager 615.

Further, OEM domain 616 includes MASA 617 and MUD server 618.

The IoT device 610 may first configure the device trust utilizing the BRSKI procedures described above with regard to FIG. 5, as shown at arrow 620. After 620, a trust relationship is established between the IoT device 610 and the local domain 611.

Subsequently, the switch 612 may be configured based on the MUD as for example outlined in FIGS. 2 and 3 above and shown in the embodiment of FIG. 6 with arrow 630. After 630, the local domain 611 has the MUD file and the switch can be configured with the policy based on the MUD file.

In other examples, BRSKI and MUD may be used together to configure both the IoT device and the router/switch. Reference is now made to FIG. 7.

In the example of FIG. 7, IoT device 710 can communicate with local domain 711, which includes switch 712, registrar/AAA 714 and MUD manager 715.

Further, OEM domain 716 includes MASA 717 and MUD server 718.

In the example of FIG. 7, the configuring the device trust utilizing the BRSKI procedure is shown with arrow 720 and includes the configuring of the switch utilizing MUD as shown with arrow 730.

Aspect: Modifications to the MUD System

Based on the above, MUD and its associated protocols is a commonly used method to configure networks to support IoT devices in accordance with the vision of the OEM for that device. BRSKI is an IETF-defined way to automate bootstrapping of a local-domain key infrastructure based on manufacturer installed device certificates and root of trust. Both are used in the task of configuring an IoT device upon onboarding.

However, these protocols do not define how to configure a switch/router and the firewall therein to support an IOT device that that has both a normal mode of communication and a secondary (e.g. emergency/anomaly) mode of operation. Further, no trigger is defined for changing the configuration from the normal to the secondary mode of operation and vice-versa, nor how such trigger should be signaled and what entity decides whether the trigger is satisfied.

Further, the protocols do not define how the system determines the address of the appropriate communication end point for use during emergencies. Specifically, in some cases, the URL or the Fully Qualified Domain Name (FQDN) of the secondary server relevant to the IoT device location may not be known in advance at the OEM side.

Figure 8:
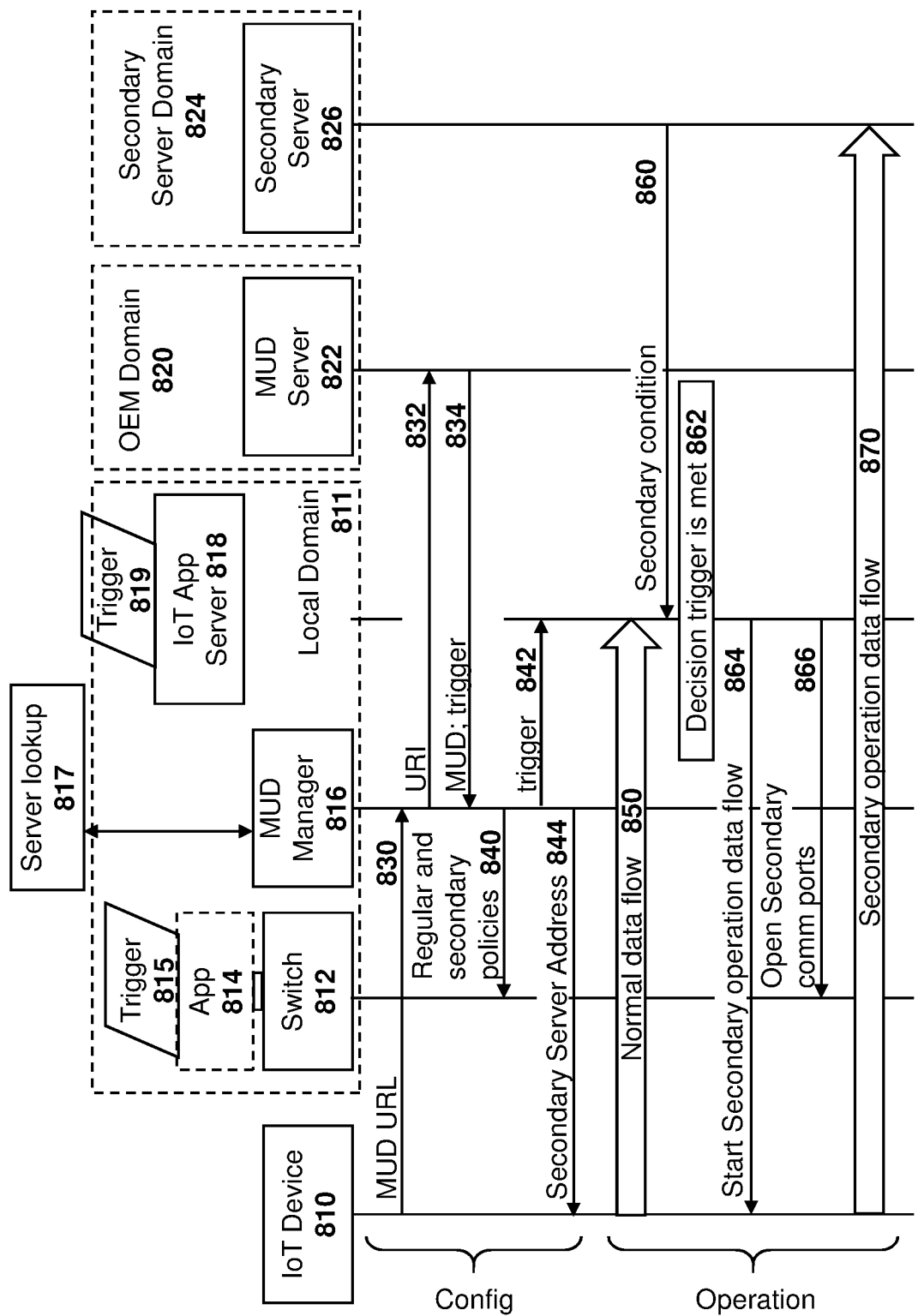
FIG. 8 is a dataflow diagram showing the configuration and operation of an IoT device in both a normal and an emergency mode of operation.

Therefore, in accordance with the embodiments of the present disclosure, an architecture having three domains is provided in the example of FIG. 8. The flow diagram shown in FIG. 8 involves three domains, namely a local domain where the IoT device is deployed, the IoT OEM domain, and the secondary services domain, referred to in this example as the Secondary Server Domain.

Specifically, referring to FIG. 8, an IoT device 810 communicates within a local domain 811. The local domain 811 includes a switch 812, on top of which an application 814 and a potential trigger 815 may exist. In some cases, the switch application 814 can determine whether the trigger 815 is met so that the switch 812 can change to a different policy.

The local domain 811 further includes a MUD manager 816, which may interact with a server lookup function 817. For example, the server lookup function 817 may involve a look up to find the local emergency services network. However, in other cases, rather than emergency services, the present disclosure could deal with other anomalies or situations where in IoT device has a primary mode of operation and a secondary mode of operation. In this case, server lookup 817 may involve looking up which server to communicate with during the IoT device's secondary mode of operation.

Further, local domain 811 may include an IoT App server 818, which may further include a trigger 819 that indicates conditions to switch from a primary mode of operation to a secondary mode of operation (and possibly also back to the primary mode, in the same or a different trigger).

The second domain is the IoT OEM domain 820, which may include a MUD server 822.

The third domain is the Secondary Server domain 824 which may include the secondary server 826. For example, the Secondary Server domain 824 may be an emergency server domain. However, in other cases where the IoT device is operating in two modes, the Secondary Server domain 824 may be any other server to which communication may exist while the IoT device is operating in its second mode.

There are two phases in the IoT device life. A first phase is a configuration phase and a second phase is an operational phase.

During the configuration phase, the IoT device 810 may send a MUD URL in message 830 to the MUD manager 816.

MUD manager 816 may then provide a Uniform Resource Identifier (URI) to the OEM domain 820 MUD server 822, as shown by message 832.

In response to receiving message 832, the MUD server 822 may provide the MUD file, which may include a trigger to indicate mode of operation change, in message 834, back to the MUD manager 816. The trigger can include one or more conditions for triggering the operation mode change.

The MUD manager 816 may provide/write both regular and secondary (e.g. anomaly or emergency) policies based on the MUD file(s) that were received in message 834 to the switch 812, as shown by message 840. The switch 812 can store both regular and secondary policies received in message 840.

Further, the trigger received in message 834, which could be part of or based on the MUD file, may be provided to the IoT App server 818 within message 842. In some cases, the trigger received in message 834 can also be provided to the switch 812.

In the embodiment of FIG. 8, an identifier, network address or location for the emergency network or other secondary operation handling network may be provided back to the IoT device 810 as part of message 844 from MUD manager 816. The MUD manager may have obtained this information from the Server lookup function 817. The identifier, network address or location for the emergency network or other secondary operation handling network may also be provided to the switch 812.

At this point, the configuration phase for the setting up of the IoT device 810 is finished.

During the operational stage, the IoT device 810 may provide normal data flow, depicted by arrow 850, to the IoT application server 818 via the switch 812 applying the regular policy.

In some cases, the secondary server 826 detects an emergency or an secondary condition, and signals this in message 860 to the IoT App server 818. For example, the message 860 can include emergency indications (such as a 911 call indication) from sources other than IoT devices 810. The secondary condition 860 may include a request for the IoT App server 818 to enable the data from IoT device 810 to flow directly to the secondary server domain 824, possibly bypassing the IoT App server 818.

Based on the trigger information received in message 842, the IoT App server 818 may make a decision on whether the trigger conditions are met based on data 850 received from the IoT device 810, other emergency indications such as a 911 call indication received in message 860, or both, as shown at block 862.

If one or more of the trigger conditions are found to be met at block 862, then the IoT App server 818 may send a command to start secondary dataflow message 864 to the IoT device 810.

Further, the IoT App server 818 may send a message to the switch 812 to open the secondary communication ports, as shown by message 866. The message 866 can indicate to the switch 812 to use the secondary policy.

Thereafter, since the trigger conditions were met and the secondary communication ports are open, emergency or secondary data may flow from the IoT device 810, via the switch 812 applying the secondary policy, to the secondary server 826, possibly bypassing the IoT App Sever 818, as depicted by arrow 870 in the embodiment of FIG. 8. In some cases, the secondary data can flow to both the IoT App server 818 and the secondary server 826.

Therefore, the embodiment of FIG. 8 provides for a policy that is enforced at a network device such as a switch of an IoT device local domain, which allows direct communication between the IoT device and an secondary services endpoint during a secondary state such as a state of emergency. For example, the direct communication is enabled between the IoT device 810 and the secondary server 826 without necessarily passing the data through the IoT App server 818.

Once the emergency or secondary operation condition has expired, the system may transition back into the normal data flow. This may involve providing a trigger condition back to the IoT App server 818, which may then send a command to resume normal data flow to the IoT device 810 and also a command to close the emergency or secondary communication ports to switch 812. Similar to the decision making at block 862, the decision to transition back to the normal operation can be based on indications from secondary server domain 824 (e.g., an indication of ending of the emergency situation), data from the IoT device 810, or both. In other cases, the emergency or secondary operation condition may be time limited and on expiration of such time, the IoT App server may transition the local domain and IoT device 810 back to normal data flow. Other options are possible.

Therefore, the embodiments described herein provide a solution which covers the case when a change in the allowable communication pattern is needed at the switch or router for an emergency or secondary operation situation that an IoT device finds itself in.

In accordance with the embodiments described herein, MUD is extended or modified to support two or more profiles or policies for an IoT or other such device. For example, a normal-use profile and an emergency profile may be two types of profiles. The embodiments herein provide solutions for devices meant to communicate via a network router, switch or gateway and a MUD manager. For this purpose, MUD is extended or modified compared to the currently defined implementations for MUD.

In a first aspect of the embodiments described herein, challenges exist on how to configure a switch or router and a firewall that are to support an IoT device that has both a normal mode of communication and a secondary mode of communication. In accordance with the embodiments of the present disclosure, an IoT device may have two distinct associated MUD files relevant to it, and the way this fact is signaled, and the secondary configuration obtained, is one aspect of the present disclosure.

In a first case, a second (and optionally a third, fourth, etc.) URL is added to be emitted by a device, in addition to the normal MUD URL. For example, such URLs may be carried in another extension in the certificate of the IoT device as configured by a manufacturer, or in another DHCP extension, or in another LLDP one sent by the device. Each additional URL points to the location of a file that specifies the secondary device behavior, where such behavior is to be specified by some other server than the MUD Server. Such other server is pointed to by the second (or third, fourth, etc.) URL, that is, the server hosts the file specifying the secondary behavior of the device.

Alternatively, if certificates are used, then the manufacturer certificate may indicate in a new field the existence of a special MUD file for secondary contexts, rather than an actual URL. In this case, the MUD manager must find other means to locate this special MUD file.

Figure 9:
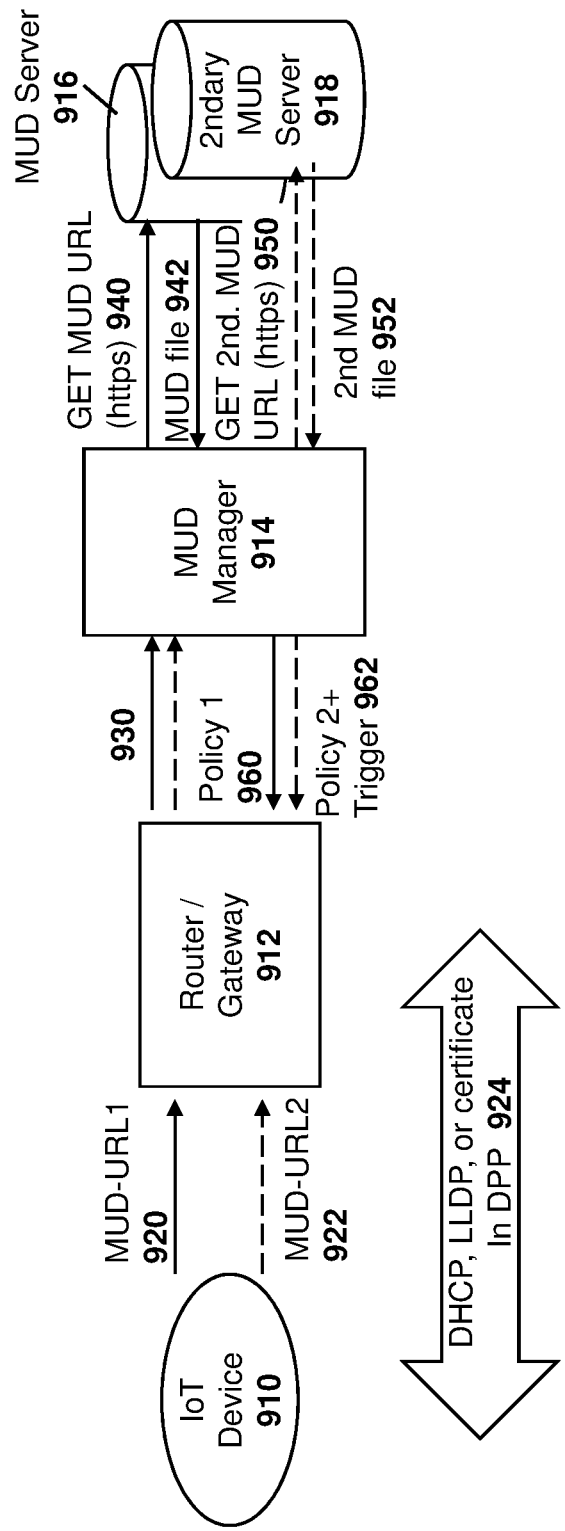
FIG. 9 is a dataflow diagram showing the sending of separate MUD URLs and the receiving of two policies at a router or gateway.

Reference is now made to FIG. 9, which shows a flow for obtaining multiple policies at a router or gateway. In the embodiment of FIG. 9, IoT device 910 communicates with a router or gateway 912. Further, the router or gateway 912 may communicate with a MUD manager 914.

In the example of FIG. 9, a plurality of MUD servers, referred to in the example of FIG. 9 as MUD server 916 and MUD server 918, may provide different MUD files for the different operational contexts. These two servers may be combined in the same physical network node, or combined logically but be physically separate.

Specifically, as shown by arrow 920, IoT device 910 emits the regular MUD URL. A second MUD URL, depicted in arrow 922, is also emitted by the IoT device 910. The emission may be done, for example, via extensions to DHCP, LLDP, or X.509 certificates as described above and as used in respective protocols between the IoT device 910 and the router or gateway 912. This is shown with arrow 924 in the example of FIG. 9. The emitting may be done in various ways. For example, it may be done at an application layer in some cases. In other cases, it might be done via QR codes. In other cases, the emitting may be performed as printed in a manual and may be manually entered via smartphone or directly into the router or gateway interface, among other options. In such cases, a smartphone may then connect to the gateway so that the gateway gets the MUD URLs.

The router or gateway 912 may forward the two URLs to MUD manager 1314, as shown with arrows 930.

The MUD manager 914, for example using an HTTPS GET request, may send such request to the MUD URL, as shown with arrow 940. This is similar to existing procedures to obtain a MUD file.

In response, MUD server 916 sends back a MUD file, as shown with arrow 942.

In an aspect, the MUD manager 914 further has the second additional URL for the secondary (e.g. emergency) context and can use such URL to fetch a MUD file from the server pointed to by the URL. For example, as shown by arrow 950, an HTTPS GET request may be sent to MUD server 918, and in response the secondary MUD file is received from MUD server 1318, as shown by arrow 952. In some cases, the MUD server 918 may be the same as MUD server 916. In other cases, the two servers may be different servers.

On receiving the MUD file as shown at arrow 942, the MUD manager 914 constructs a normal context policy as currently performed. Further, on receiving the secondary MUD file, as shown at arrow 952, the MUD manager 914 writes a policy for the secondary context. For example, this may be an emergency context, where an emergency context includes the environment conditions, parameters, and state of play during a case of emergency, from the point of view of an IoT device.

The MUD manager 914 sends the first policy, as shown by arrow 960, to the router or gateway 912. Further, the MUD manager 914 sends the second policy, optionally along with the trigger, to the router or gateway 912, as shown with arrow 962.

Therefore, in accordance with the embodiment of FIG. 9, two URLs are provided, and two policies are returned to the router or gateway 912.

Figure 10:
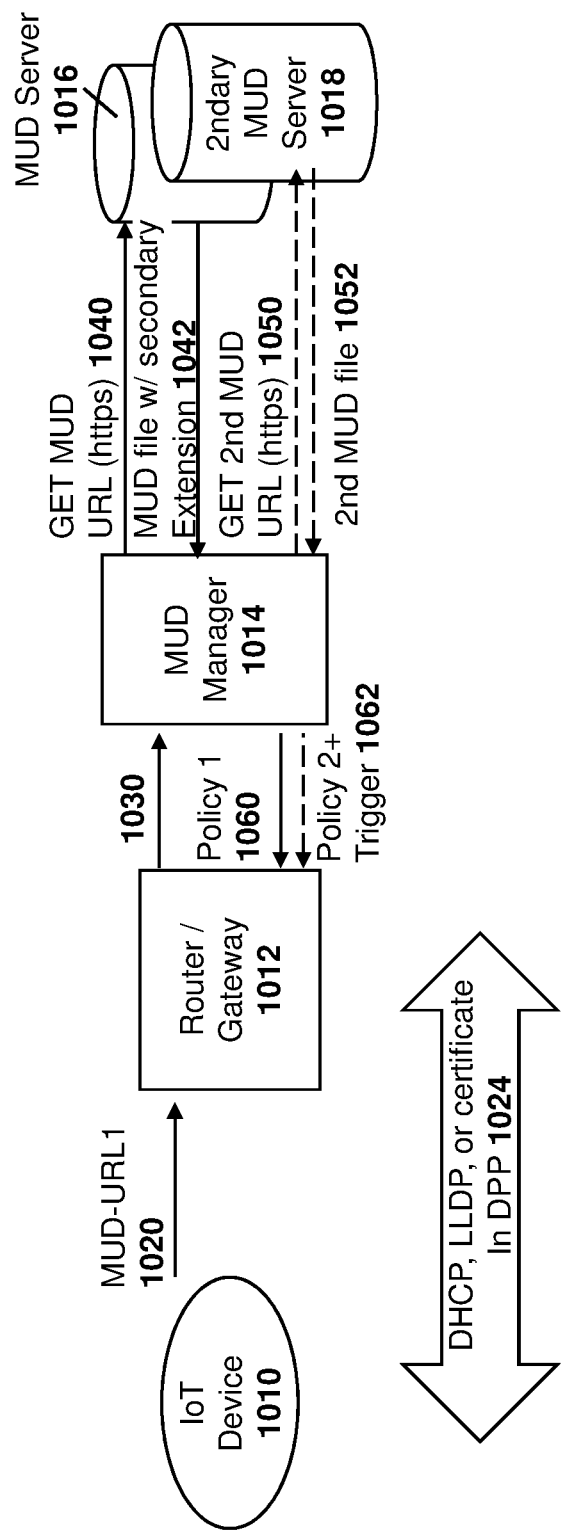
FIG. 10 is a dataflow diagram showing the sending of a single MUD URL and the receiving of two policies at a router or gateway.

In a further embodiment, only one URL is used, and it is the MUD server that has knowledge that a secondary MUD file exists. The MUD server may signal this information to the MUD manager when it returns the MUD files. Reference is now made to FIG. 10.

In the embodiment of FIG. 10, the secondary MUD file is downloaded from the same URL. That is, the MUD file server may return any or both of the two or more MUD files associated with the IoT device. In another option, the MUD file server may return a normal MUD file and an additional redirect command to another MUD file server for the secondary use policy. For example, this may include returning a secondary URL for the MUD manager to obtain the second MUD file.

In the simplest context, a normal MUD file contains information for both the primary and secondary use communication endpoints.

When there is no indication of a secondary MUD file from the device, the MUD manager may not know if there is a MUD file for emergencies or secondary uses until the MUD server actually returns two files.

Therefore, in the example of FIG. 10, IoT device 1010 communicates with a router, switch or gateway 1012. Further, the router or gateway 1012 may communicate with the MUD manager 1014.

In the embodiment of FIG. 10, a primary MUD server 1016, along with a secondary MUD server 1018, exist.

The IoT device 1010 in this case emits the normal MUD URL, as shown by arrow 1020, and as is currently done in the art.

The router or gateway 1012 forwards the received URL to the MUD manager 1014, as is currently done in the art.

The MUD manager 1014, for example using an HTTPS GET request, may send the MUD URL. This is shown with arrow 1040, where the request is sent to MUD server 1016.

In response, the MUD manager 1014 receives a MUD file, as shown with arrow 1042. The MUD file returned may contain an extension to indicate the parameters for secondary communication endpoints, or may contain a URL for obtaining a secondary use MUD file. Such URL may point to a different file (resource) on the same server or may point to a different server.

Alternatively, the MUD server sends, along with the original MUD file, a second MUD file for the secondary use.

The example of FIG. 10 shows the case where the extension includes the URL for a second MUD server.

Therefore, in an optional step in FIG. 10, the MUD manager 1014 extracts the URL for the secondary MUD server 1018 and sends, for example, an HTTP GET request to the secondary MUD server 1018, as shown with arrow 1050.

In response, the MUD manager 1014 receives the secondary MUD file, shown with arrow 1052. MUD server 1016 and MUD server 1018 may be the same server or may be different servers.

MUD manager 1014 may then construct a normal context policy as is currently done using the MUD file received at arrow 1042. The MUD manager 1014 may also write a policy for the secondary context using the MUD file received at arrow 1052.

MUD manager 1014 may send the first policy to the router or gateway 1012, as shown with arrow 1060. The MUD manager 1014 may further send the second policy and optionally a trigger, as shown at arrow 1062, to the router or gateway 1012.

For both the embodiments of FIGS. 9 and 10, a given MUD file server hosts the MUD file for secondary policies. The same MUD file server can be used for the normal use MUD files, for example for all types of IoT devices, or for devices from a given manufacturer, among other options. In other cases, the normal MUD file could come from a different MUD file server.

Triggers

The MUD file for the secondary context can contain a new element to indicate the trigger that is expected to make the IoT device change policies, from a manufacturer point of view. For example, such new element may be referred to as a "secondary-trigger" or an "emergency-trigger", among other options.

For example, for a temperature sensor, the trigger may be any reading of 140 degrees Fahrenheit (60 degrees Celsius) or higher.

A trigger may have a condition to transition into the secondary state and may further in some cases have a condition to transition back to the primary or normal state. The conditions may be the same or may be different. For example, in some cases, the temperature sensor may need to have a reading below 122 degrees Fahrenheit (50 degrees Celsius) to revert to the normal state.

Regarding such trigger, the trigger may have a Trigger element syntax. This trigger may be use-case specific, and thus the element itself in the MUD file may be a string or some other type of defined node/element that allows for flexibility in the expression of this trigger. In some cases, such string may be human-readable.

As an example, an element with the same syntax as an element called "systeminfo" of the IETF MUD file could be used for the trigger. Both of these, along with other information, are meant for human user (administrator) consumption. Such other information may include, for example, whether the device is still supported by the manufacturer or not, among other information.

These fields are common to many devices, for example all sensors of type "X" in an industrial IoT scenario, so the decision to accept this type of IoT device onto the network can be done once per device type and additional device acceptance can be automated, as described below.

In some cases, the trigger element can be incorporated in the secondary-use policy that the switch, router or gateway can enforce once a secondary mode of operation (e.g. a state of emergency) is declared.

Further, to allow for the network administrator, such as those supporting a building management system, to also have control over the trigger setting, the trigger threshold setting received in the secondary-use MUD file can, in some cases, be augmented or overridden when producing a secondary policy written by the network administrator. This therefore allows for local domain control.

For example, a manufacturer may indicate that a state of emergency for its thermometer exists when a reading is above 140 degrees Fahrenheit (60 degrees Celsius). But the network administrator in the local deployment may override that to be 130 degrees Fahrenheit (54 degrees Celsius), since the facility where this IoT device is deployed is climate controlled. In other cases, the network administrator may specify that even a reading of 130 degrees Fahrenheit is not sufficient, but some other condition must be met. For example, the temperature must stay at the threshold level for 15 minutes, among other options.

As provided in FIG. 8, 9 or 10, the MUD Manager, once it has obtained the trigger from the MUD file, or via other means, could inform the IoT platform server of the trigger for that device. This protocol may be application specific.

In other cases, the IoT device may be configured to know what the trigger is, and may be able to act when the trigger threshold is met, for example to connect to a different endpoint (the emergency response server), and send data to the endpoint that is either the same (as in normal use) or different. In addition, or alternatively, the IoT device may take input (application-layer commands) from that endpoint.

Alternatively, the IoT device may not be aware of the trigger but can take application-layer commands from the IoT service platform to send data to a different endpoint.

Deciding a trigger is met can be done by the IoT device itself, by the Router, gateway or switch in some cases, and/or by the IoT platform server (e.g. IoT App server 818 from FIG. 8). If the decision is performed at the router, gateway, switch or server, that entity may need to not only know what the trigger is, but also include application-layer logic to be able to process the data from the device, and decide whether it warrants the declaration of an emergency/secondary condition, and therefore a policy change. In the case of the IoT platform server, the decision that there is an emergency/secondary situation may alternatively be taken independently of any IoT device data, such as but not limited to a 911 or 112 call indication from the secondary server domain 824 or other human-sourced information, or based on both external input and data from one or more IoT device.

IoT Platform Server Decides the Trigger Condition is Met

Therefore, in accordance with one embodiment, the IoT platform server (or IoT App server) decides that the trigger condition is met, and then informs the device and switch. This decision may be based on the data it receives from the IoT Device and/or on other data.

In this case, the trigger condition being met is decided at the IoT service platform server. This may limit the attacks whereby a device is controlled by an attacker to cause a state of emergency or other secondary state, and a policy change, or any other actions that such a state may bring about.

Figure 11:
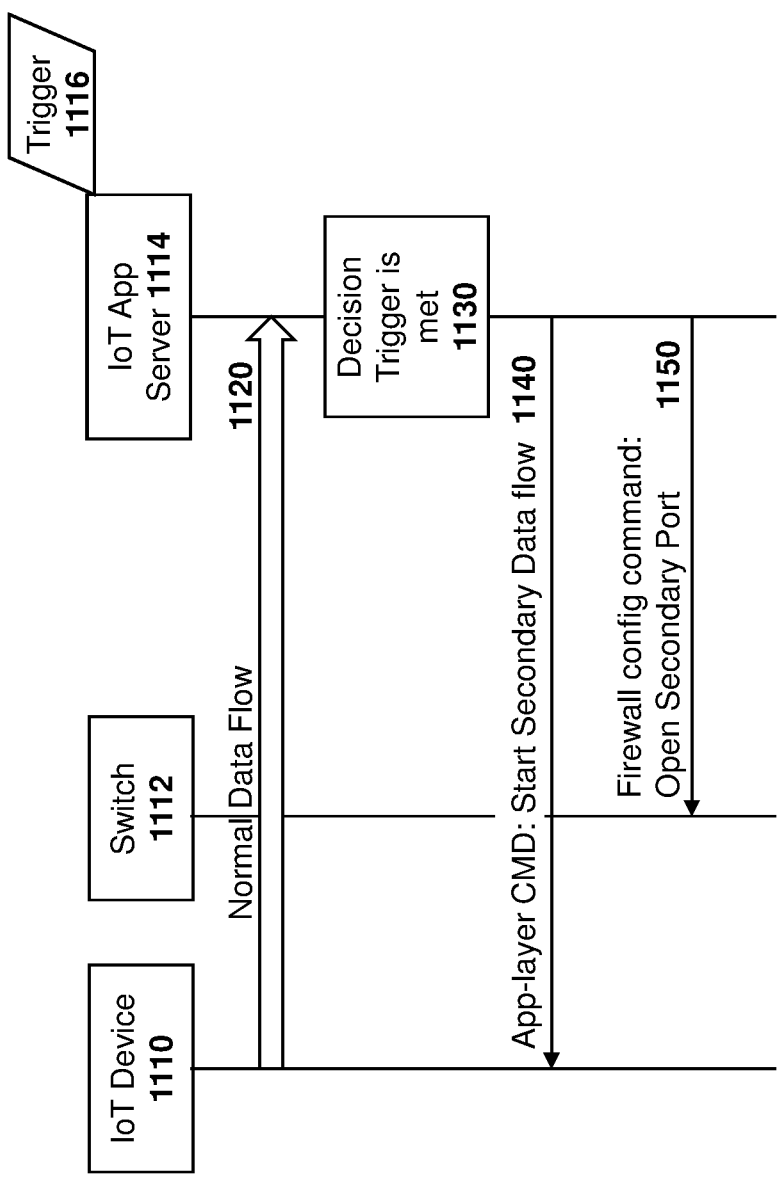
FIG. 11 is a dataflow diagram showing the transition from a normal mode of operation to an emergency mode of operation based on a decision at an IoT application server.

In particular, reference is now made to FIG. 11, which shows a flow diagram between an IoT device 1110, switch 1112 and an IoT application server 1114, also referred to herein as the IoT service platform server.

In this case, the IoT application server 1114 may have information about a trigger 1116 for an emergency/secondary situation.

During normal operation, normal data flow, as shown with arrow 1120, occurs between the IoT device 1110 and the IoT application server 1114.

The IoT application server 1114 can determine when an emergency situation or secondary situation can be declared, as shown with block 1130.

Once an emergency or secondary situation is declared, the IoT application server 1114 can send a message 1140 to IoT devices requesting that they switch policies. Switching policies allows additional or different destination addresses and ports for data communication. In the embodiment of FIG. 11, message 1140 is shown to the start emergency data flow. However, in other cases, the message may be to start secondary condition data flow. In other cases, the message may be to resume normal data flow if the trigger at block 1130 is a trigger to resume the normal conditions. Other options exist.

The IoT application server 1114 can also send a message 1150 to the affected routers/gateways to switch over the policy. This is similar to message 866 from FIG. 8. A switch 1112 may be asked to change policies for all of its devices even if none of the devices it services actually had met the trigger threshold condition.

The IoT devices whose policy needs to change may be just the device that triggered it, or it may include other devices under the gateway/router.

To avoid a race condition, the IoT device 1110 should not switch policies without the router having switched policy. If the IoT application server 1114 commands the policy change, then the IoT application server 1114 may need to inform both the router (switch 1112) and the IoT device 1110, so that the router does not drop the packets the IoT device 1110 intended to send to the emergency/secondary server. This might, for example, be achieved by including a 'time of activation' within the messages that are sent to the IoT device 1110 and the switch 1112, where the 'time of activation' indicates the time at which both should start applying the new policy.

In one example of how an IoT application server 1114 can cause a switch 1112 to change policies, the firewall vendor can make an Application Program Interface (API) available to the firewall configuration application running on the switch 1112 and in a server (e.g., the IoT App server 1114). This API can be called by the IoT application server 1114, which is running an IoT application.

The end result is that a new data pipe to the emergency communication or secondary communication endpoint is instantiated at the IoT device 1110, as for example done at arrow 870 in the embodiment of FIG. 8, and an update is additionally made to the access control list, including the firewall, on the switch 1112. Once another trigger for the emergency is obtained at the IoT application server 1114, indicating the emergency/secondary context is no longer there, the policy may be switched back to the normal-use for the affected devices and switches. In some cases, the access control list includes a set of IP addresses to which the communication is allowed.

Application-Layer Logic on the Switch Decides the Trigger Condition is Met

In an alternative embodiment, application layer logic on the switch may decide that the trigger condition is met, for example by intercepting data from the device. The switch also informs the IoT platform server that the trigger condition has been met.

Figure 12:
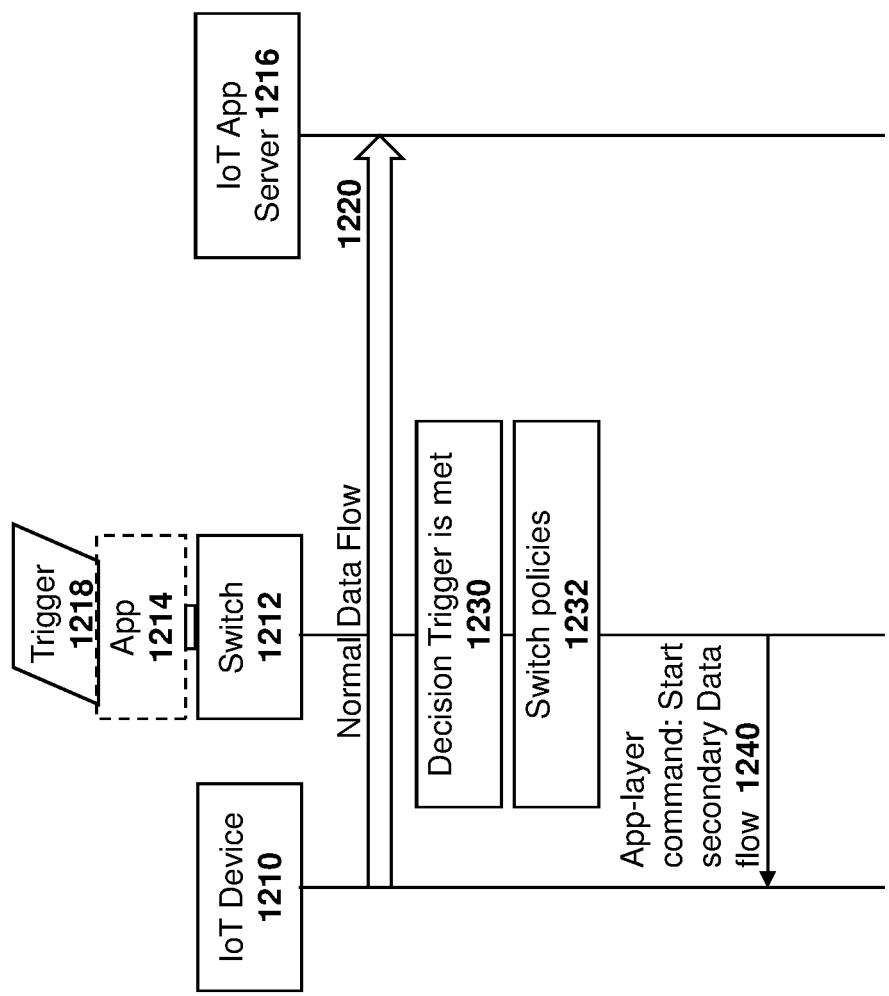
FIG. 12 is a dataflow diagram showing the transition from a normal mode of operation to an emergency mode of operation based on a decision at a switch.

In particular, reference is now made to FIG. 12, which shows a flow diagram between an IoT device 1210, switch 1212 having application layer logic 1214, and an IoT application server 1216, also referred to herein as the IoT service platform server.

In this case, the switch 1212 may have information about a trigger 1218 for an emergency/secondary situation.

During normal operation, normal data flow, as shown with arrow 1220, occurs between the IoT device 1210 and the IoT application server 1216.

If the trigger 1218 is enabled in the switch 1212, which occurs in deployments where the switch 1212 has application knowledge that enables it to declare a state of emergency based on sensor data it receives from the device 1210, then the switch 1212 makes the decision that the trigger is met at block 1230 and changes the policy, as shown by block 1232 from a normal-use policy to the emergency/secondary use policy.

The switch 1212 can use application-layer signaling to inform the IoT device 1210 to change communication endpoints, as shown by message 1240.

The end result in this embodiment is that a new data pipe to the emergency/secondary communication endpoint is instantiated at the IoT device 1210. Once another trigger for the emergency is obtained, indicating the emergency/secondary context no longer exists, the policy may be switched back to the normal-use for this device.

Address of Appropriate Secondary/Emergency Endpoint

In a further embodiment of the present disclosure, a local deployment domain may find an appropriate emergency/secondary communication server(s) and adds that information to the ACL enforced at the switch/router/gateway in the network where IoT device finds itself. Such operation could be done by a network administrator. The embodiments described below use an emergency situation for the secondary mode of operation. However, this is not limiting, and is provided for illustration only.

The local emergency/secondary server FQDN is used to update the ACL. For example, in the emergency case, at a high level, the switch/router of the IoT deployment looks up the Emergency Services IP Network (ESInet) FQDN and adds it to the ACL for its emergency-use policy. In some cases, this may require some level of application, specifically Domain Name System (DNS) protocol, awareness by the ACL enforcement entity on the switch.

In a subsequent operation, the device may be informed about the ESInet so that it knows where to send data in case an emergency is declared. This operation can be done, for example, using an application-layer message from application-layer logic on the router/switch or via an application-layer message from the IoT service platform server.

Various options exist for determining emergency services address (FQDN or IP address). In a first example, the emergency services address may be determined at the local deployment domain. In a second example, the emergency services address may be determined at the OEM cloud or OEM domain. After that, what is done with this information is described above with regards to FIG. 8.

Therefore, in one aspect of the present embodiment, an entity or functional block is introduced that does lookup of local ESInet/PSAP based on location, referred to as "ESInet Lookup function" or "Server Lookup" function. Such an entity can be deployed at the local domain ("on premise") or at the OEM cloud, and the lookup can be done by a network administrator.

Specifically, emergency information, such as the PSAP and ESInet domain name including FQDNs, depends on the region or geographical area where the device is located. This information is retrieved at the manufacturer site, or at the deployment site, for example by a MUD Manager, a BRSKI Registrar, or by a $3^{rd}$ entity.

Further, the FQDN/URL of the emergency server can be constructed by a device or by a MUD manager using a potentially standardized method for constructing the FQDN/URL. The constructed FQDN/URL may be customized for each geographical region, by for example inserting the country name for that particular location into a character string with prescribed elements. This may be similar to an approach used in the Third Generation Partnership Project (3GPP) wherein emergency numbers (as opposed to IP addresses) can be obtained via DNS query by using a FQDN construction that is defined in 3GPP TS 23.003, for example using a string of comma-separated-labels: "sos.en.epc.mcc<MCC>.visited-country.pub.3gppnetwork.org, where MCC is the Mobile Country Code used in 3GPP telephony.

In a first case in the present embodiment, the emergency endpoint (or other secondary endpoint) server address information is determined at the local deployment. In this case, the URL of the emergency MUD file, or the communication endpoints for emergency use to be used in constructing an emergency policy, are not given in the normal process of MUD provisioning. However, indications that such a policy exists somewhere may be already given, but the exact location (URI) of this file is not given. That is, the MUD Manager is left with the task to find the emergency communication endpoint information from which to make a local policy.

In a second case of the present embodiment, emergency endpoint server address information may be determined at the manufacturer domain.

In this case, no MUD URL is used, but the OEM can return a MUD file augmented with the secondary endpoint information such as the ESInet and/or PSAP information for the local domain. The OEM finds out the local domain of the IoT in question using information piggybacked on the messages normally sent to the OEM server by the BRSKI Registrar or the MUD Manager in the process of bootstrapping or onboarding respectively.

Specifically, when BRSKI is used for bootstrapping a device, it enables a local domain to securely configure the device with information and credentials that the device can use in communications. MUD functionality similarly provides mechanisms for making the corresponding configuration of switches/routers in the local domain. Since IoT devices and switches/routers both need to be configured to support communications, it is possible that BRSKI (device configuration) functionality can be leveraged by MUD (router configuration) functionality and vice versa. Hence if a BRSKI Registrar determines the address of secondary servers such as the ESInet servers needed for configuration of the IoT device, then this information can also be made available to a MUD manager for configuration of the router and vice-versa.

In the above, the Local Emergency contact refers to locally relevant ESInet server(s) and/or PSAP addresses, including IP address, URL, and/or SIP URI, among others.

ESInets can range in locality from "local", being a single PSAP, county, or small call center area, to regional, national, and international.

Both ESInet info and PSAP info may be a FQDN, URL or URI. This information is retrieved given a geographical area and can be stored at the OEM cloud and/or at the local deployment.

Further, a domain may span several areas, including regions or countries. For emergencies, a DNS lookup may return a local server IP Address to handle emergency calls for that region or geographic area.

Therefore, based on the above, emergency information may be added either at the deployment network or at the OEM cloud.

Emergency Information Added at the Deployment Network

In accordance with this aspect of the present embodiment, the solution is based on MUD. It consists of a MUD manager looking up the local ESInet or secondary server and then including that information in the access control list or firewall setup as part of the onboarding of the IoT device.

Figure 13:
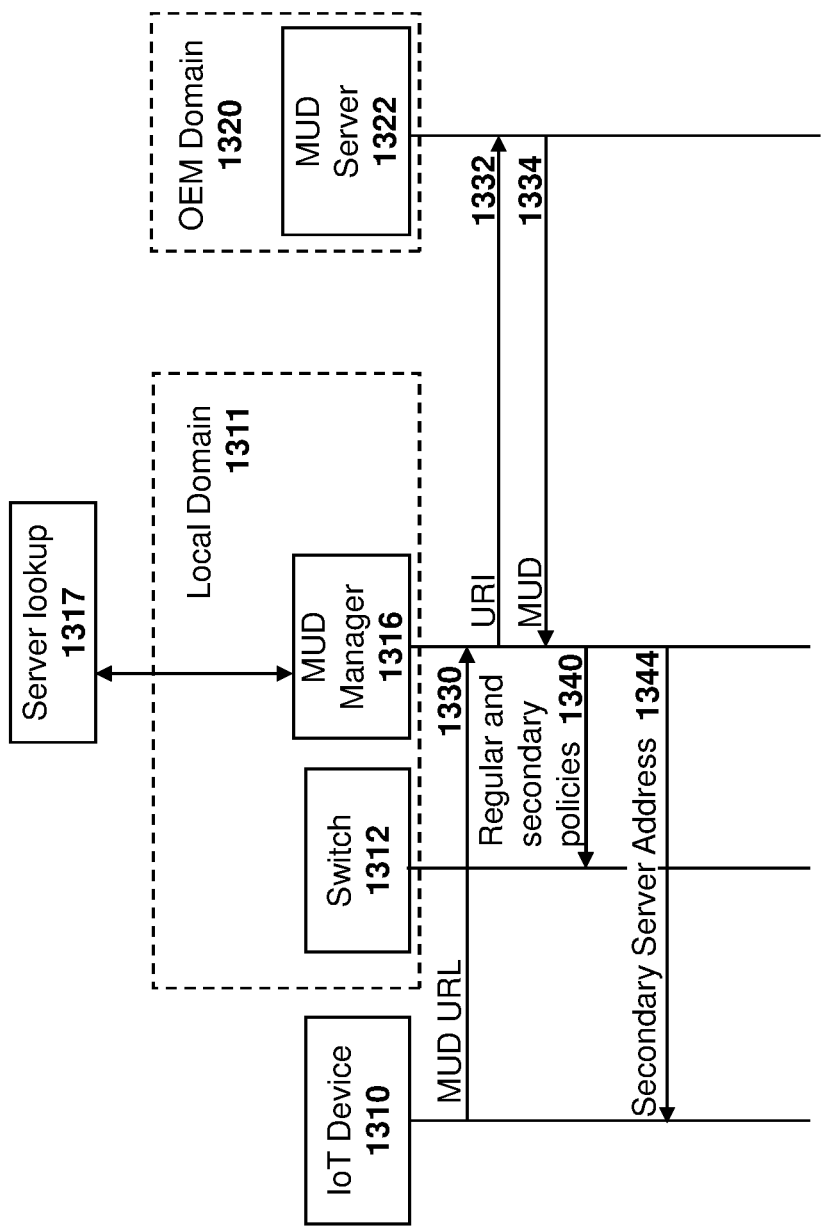
FIG. 13 is a dataflow diagram in which a MUD manager retrieves the emergency contact information and adds such information at the local domain side.

Reference is now made to FIG. 13, which shows a more detailed view of messages 830, 832, 834, 840 and 844 from FIG. 8. In the embodiment of FIG. 13, an IoT device 1310 communicates with a local domain 1311. Within local domain 1311, a switch 1312 and MUD manager 1316 exist.

A server lookup function 1317 may include an ESInet lookup.

Further, an OEM domain 1320 includes a MUD server 1322.

For the emergency services example, emergency contacts are locally relevant ESInet server(s) and/or PSAP addresses, including but not limited to an IP address, SIP URI, among other options. These can be known at the MUD manager 1316 by being looked up or stored either by a special entity such as the server lookup entity 1317 or by the MUD manager itself.

The process outlined in the embodiment of FIG. 13 starts with the IoT device 1310 sending the MUD URL to the MUD manager 1316 in message 1330. Message 1330 may be sent via the switch 1312.

MUD manager 1316 obtains a MUD file, which may include a trigger in some cases. This is done by sending the URI to the MUD server 1322 in message 1332 and receiving the MUD file and potentially a trigger in message 1334 from MUD server 1322.

The MUD manager 1316 may make a regular or normal-use policy and it may also make a secondary policy such as an emergency policy. The emergency policy may, for example, be made by augmenting a regular use policy. The creation of the secondary policy may be based on the stored emergency contact information or other secondary information. These policies may be sent to switch 1312 in message 1340.

The MUD manager 1316 may then tell the IoT device 1310 of the ESInet using message 1344.

Emergency (Secondary) Information Added at the OEM Cloud

In some embodiments, the OEM may have both the MASA server from the BRSKI and a MUD server. In other cases, the OEM may just have the MUD server, and optionally, a secondary service (for example ESInet) lookup function that takes a geographic area and returns an FQDN, URL or URI of the locally-relevant secondary/emergency services ESInet or PSAP. The embodiments described below will reference the emergency services as the secondary services. However, this not limiting and other forms of secondary services are possible.

In accordance with the first case, the OEM has both the MASA server and the MUD server. In this case, the MASA server looks up the locally-relevant ESInet in at least one of two ways.

A first way includes a direct look up, using an ESInet look up function.

A second way includes looking up in an Ownership tracker if one is employed, assuming that the Ownership tracker records an IoT device deployment network, location and the ESInet for that location. The locally-relevant ESInet is the ESInet servicing the local domain as reported by the BRSKI Registrar, or obtained from a look up of the source IP address of the BRSKI traffic. The MASA server tells the MUD server of the local emergency FQDNs, and the MUD server includes them in a MUD file.

Optionally, this operation is triggered when the MUD server asks the MASA server to look up the local emergency FQDN, URI or URL.

Figure 14:
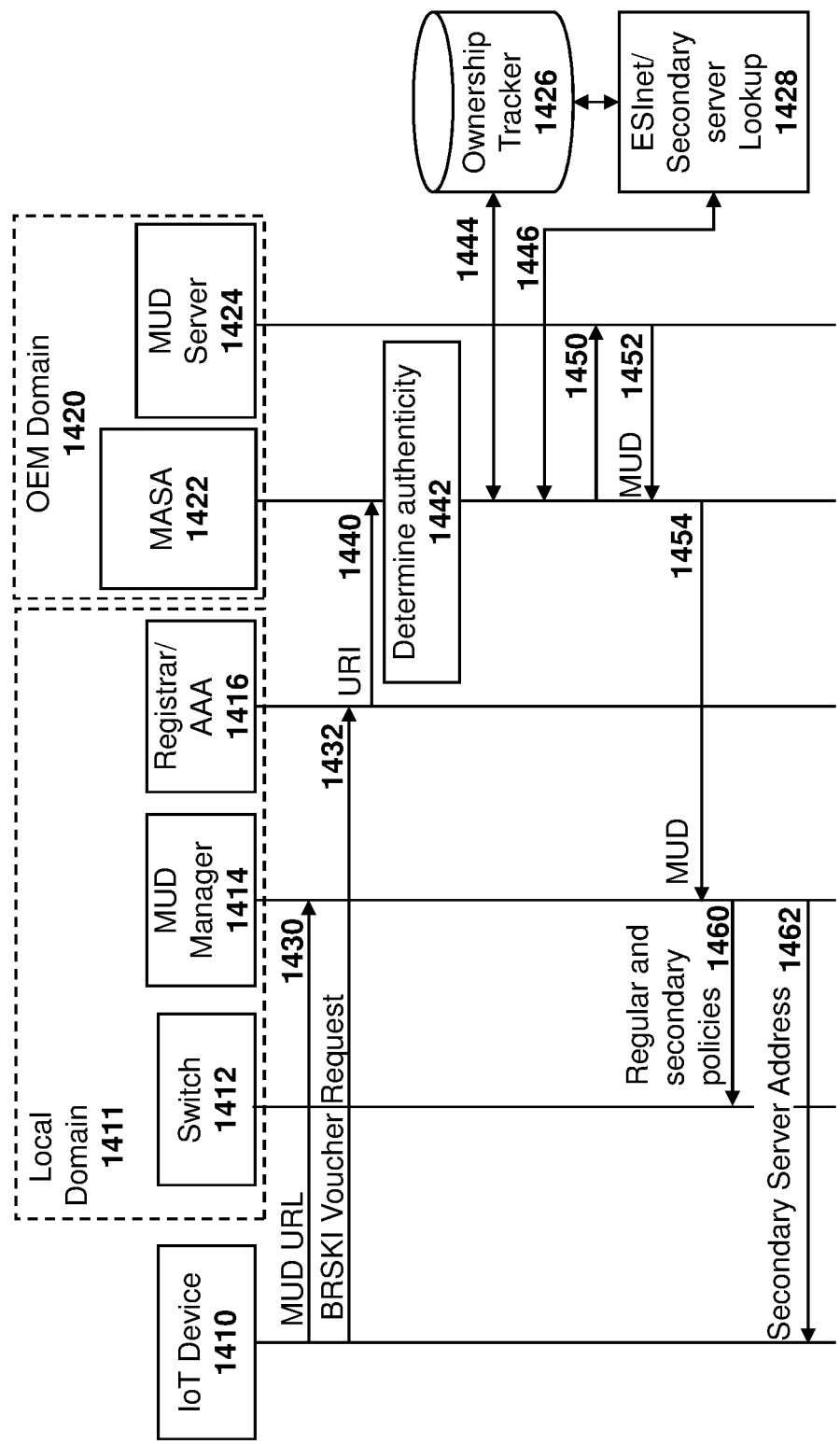
FIG. 14 is a dataflow diagram in which an Original Equipment Manufacturer server retrieves and adds the emergency contact information in a system including both BRSKI and MUD.

Reference is now made to FIG. 14, which shows an architecture in which the BRSKI Registrar and the MUD manager are assumed to communicate or be co-located in a local domain. In the example of FIG. 14, at the OEM side, the BRSKI MASA server and the MUD server have a secure communication channel.

Further, in this architecture, "Emergency Contacts" or "ESInet" are locally relevant ESInet server(s) and/or PSAP addresses, including but not limited to IP addresses, SIP URI, FQDN, URI or URL, among others. Further, the MASA server has access to, or is able to obtain, such information.

In particular, in the embodiment of FIG. 14, IoT device 1410 communicates with a local domain 1411. Local domain 1411 includes a switch 1412, a MUD manager 1414, and a registrar/AAA 1416.

The OEM domain 1420 includes the MASA server 1422 and a MUD server 1424.

At message 1430, the IoT device 1410 sends the MUD URL to the MUD manager 1414. The MUD manager 1414 may then tell the BRSKI Registrar of the MUD URL (not shown).

In message 1432, the IoT device 1410 sends a BRSKI Voucher request to the registrar/AAA 1416.

The registrar/AAA 1416 may then send the voucher (authenticity) request 1440 to the MASA server 1422, containing a MUD URL and a locality. For example, such locality may include the current state, province, or country, among other such geographic information.

The MASA server may then determine the authenticity of the IoT device 1410, as shown at block 1442.

The MASA server may then look up the ESInet for that locality. This may be done, for example, by querying an Ownership tracker 1426, as seen with arrow 1442. This may be done if the information for such Ownership tracker is provisioned along with the domain of the deployed IoT device 1410. Alternatively, or in addition, it may involve querying an ESInet (or other secondary server) lookup 1428, as shown with arrow 1446, for example based on a geographical region.

The MASA server 1422 may then send a message 1450 to MUD server 1424 using the MUD URL and asks MUD server 1424 for the MUD file for IoT device 1410. The MASA server 1422 may optionally send the MUD server 1424 the ESInet address that was looked up using arrows 1444 and/or 1446.

The MUD server 1424 then sends the MUD file in message 1452 to MASA server 1422, optionally including the ESInet address in the MUD file.

In message 1454, the MASA server 1422 returns the authenticity verdict for the IoT device 1410, along with the MUD file, to the MUD manager 1414. Further, message 1454 may contain either emergency contact information (e.g., ESInet address that was obtained) or another MUD file for secondary use.

The registrar/AAA 1416 completes the authentication/authorization of the IoT device 1410 using the authenticity verdict.

The MUD manager 1414 makes two policies for the switch 1412 of the IoT device 1410. One of the policies is for regular use and the other of the policies is for secondary use. The policy for secondary use includes allowing communications between the IoT device and the secondary server contact (e.g., ESINet) that was obtained from message 1454. In other embodiments, the MUD manager 1412 may combine the two policies into one. The regular and secondary policies are then provided to switch 1412 in message 1460.

Further, the determined Secondary Server address may be reported to the IoT device 1410 in message 1462.

Figure 15:
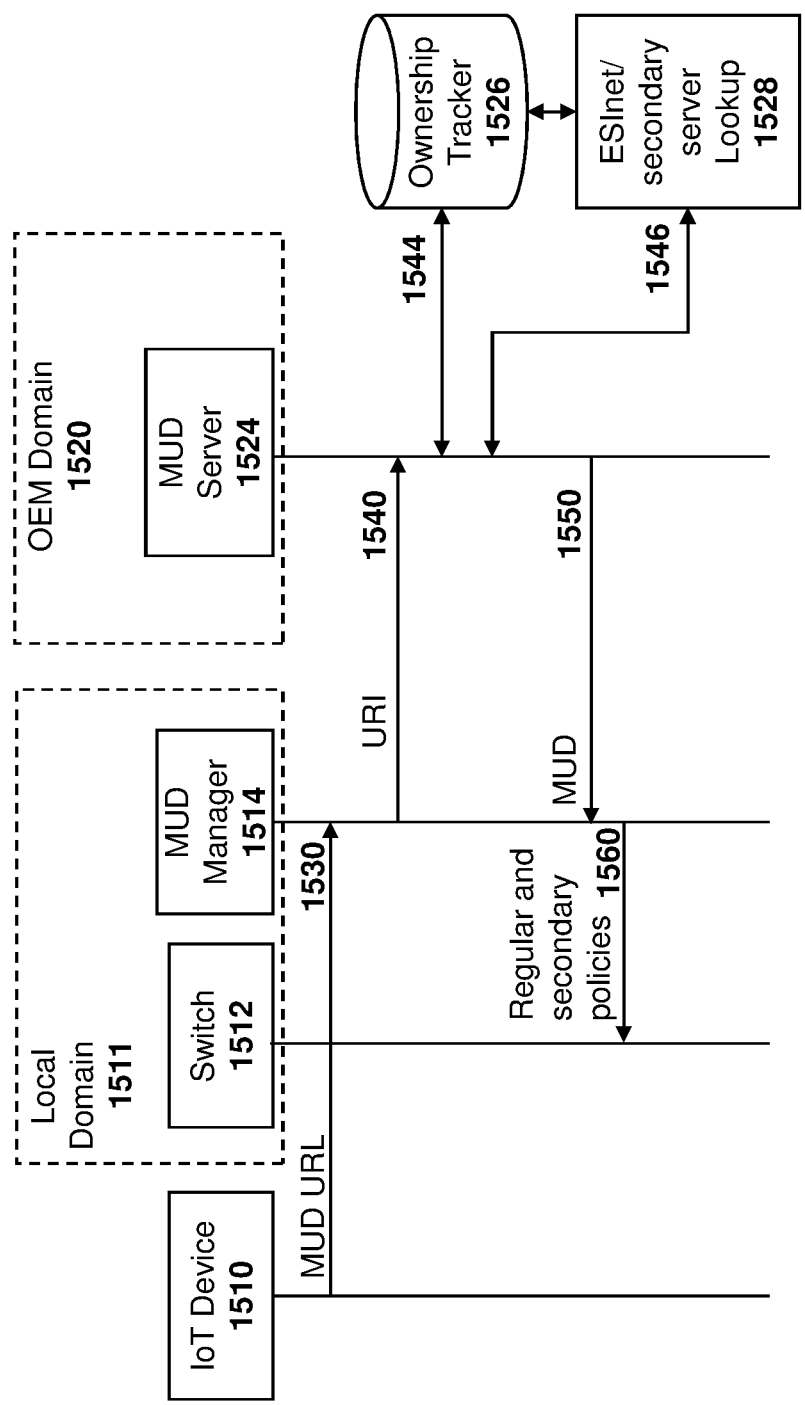
FIG. 15 is a dataflow diagram in which an Original Equipment Manufacturer server retrieves and adds the emergency contact information in a system including only MUD.

In the case where no BRSKI nodes exists, a MUD server looks up the ESInet address, for example the FQDN, URI, URL, and/or SIP URI, among other options, for the geographic area as given by the MUD manager or determined from the source IP address of the endpoint that provided the traffic. The MUD server then includes this "emergency contact" information in the MUD file for that device and re-signs that MUD file. Alternatively, the MUD server may return the information to the MUD manager separately from the MUD file, or in an emergency-use MUD file. Reference is now made to FIG. 15.

In the embodiment of FIG. 15, an IoT device 1510 communicates with a local domain 1511. Local domain 1511 includes a switch 1512 and a MUD manager 1514. OEM domain 1520 includes MUD server 1524.

In the example of the FIG. 15, "emergency contacts" are addresses of locally-relevant ESInet server(s) and/or PSAP addresses, including, but not limited to, FQDN, URI, URL, IP addresses, SIP phone numbers, among others. A MUD server 1524 has access to this information.

The MUD URL is sent from IoT device 1510 to the MUD manager 1514, as shown by message 1530.

The MUD manager 1514 then contacts the MUD server 1524 in the OEM domain via, for example, an HTTPS GET, and includes the locality of the local domain, and optionally an identifier of the device, in the message 1540. The locality may include any geographic indicator, including state, province, country, among other options.

The MUD server 1524 obtains local domain emergency information from an ESInet/Secondary Server Lookup Entity 1528 that looks up such information based on the location information provided by MUD manager 1514. Alternatively, the MUD server gets that information directly from an Ownership tracker 1526, assuming such database stores some device identifier and its deployed location and Emergency contact information; the MUD server provides the device identifier to the Ownership tracker and obtains the Emergency contact information (e.g., ESInet) or secondary server contact information for that device. These look ups are shown with arrows 1544 and 1546 respectively in the embodiment of FIG. 15.

MUD server 1524 then incorporates this ESInet information in one of various ways. In a first way, the MUD server 1524 may modify the MUD file to add a MUD URL for a different secondary server. In a second way, the MUD server may add emergency/secondary contact information to the MUD file and re-sign that MUD file. In a third way, the MUD server 1524 may make a new secondary MUD file to return along with the original MUD file. Other options are possible.

Once the ESInet/Secondary Server information is incorporated, the MUD server 1524 then returns this information in message 1550 to MUD manager 1514.

The MUD manager 1514, following the general procedures of IETF RFC 8520 for writing policies out of MUD files, may make two policies for the switch 1512 of the IoT device 1510. A first policy would be for regular use, and another policy would be for secondary use. In some cases, the MUD manager 1514 may combine both into one policy, potentially after fetching the emergency-use MUD file from another MUD file server as provided above.

The regular and secondary policies may then be provided to switch 1512 in message 1560.

Where to Initiate a Connection

In the embodiments of FIGS. 7 to 15, once an emergency occurs, a device will need to know where to initiate the emergency connection. In case the device already has the FQDN of the emergency services stored as part of the configuration as described above, then when the device gets instructed by the IoT service platform server to switch to an emergency mode, then at that time the IoT device can do a DNS query for the FQDN of the emergency services it has stored. The router or switch can sniff the IP address coming back from the DNS server and then configure the ACL to allow connectivity to this address. This procedure is similar to that employed by application-aware firewalls.

In case the device does not have the FQDN of the emergency services stored, an instruction from the switch or router or from the IoT platform server to the IoT device to switch to the emergency mode may also contain the URL of the IP address(es) of the locally-relevant service IP-level entities that this device is asked to now be prepared to send data to.

Message Formats

Various approaches can be applied to signal to the MUD manager that an emergency (secondary) policy exists for the IoT device, and how to retrieve it as part of the IoT device onboarding. In a first option, the device comes with or emits two different MUD URLs, one meant to retrieve the routine operation MUD file, and the other for an emergency/secondary operation MUD file. The MUD manager then can retrieve both, in any order.

For example, the URLs may be in the form described in Table 1 below.

TABLE 1

Example MUD URLs

| | |
|---|---|
| Regular | "mud-url": "https://iot-device.example.com/name" |
| Secondary | "mud-url": "https://iot-device-emergency.example.com/name" |

In another option, an IoT device emits a MUD URL, but also emits another new data field indicating the existence of an emergency policy. For example, a field may be called "emergency-policy-exists". This information may be printed or showed in the device manual, either paper or online, on a label on the device, through an additional QR code, among other options. This new data field is processed by the MUD manager, which then has to find the location of the emergency MUD file.

From these signaling options, the MUD manager has this foreknowledge of an existence of an emergency policy from the fact that the IoT Device (Thing), in one case, may change the way it uses DHCP, if DHCP is the way it is configured to use in the first place. The modification is that the DHCP option defined in section 10 of RFC 8520 can contain the URI of the emergency-use MUD file appended after a space after the MUD URI string, as permitted by RFC 8520, for example.

In a second case, the MUD manager has this foreknowledge of an existence of an emergency policy from the fact that the IoT Device (Thing) changes the way it uses LLDP, if LLDP is the way it is configured to use in the first place. The modifications would be an extension with a new subtype.

In a third case, MUD manager has the foreknowledge of an existence of an emergency policy from the fact that the IoT Device (Thing) presents a device certificate that includes an additional extension holding the emergency MUD URI.

Details on the specific changes to the signaling required to achieve the approach of Table 1 above are now disclosed as ways to extend the MUD RFC. Similar extensions could be made for the approach adding a new data field.

In one case, the extension could be via the "reserved" string (1 octet) in the MUD URL DHCP, pursuant to section 10 of IETF RFC 8520. Specifically, if the MUD manager knows the URL of the emergency-use MUD file, then the DHCP approach is modified in accordance with the following. Following a space after the MUDstring, an emergencyuseMUDstring is added, as shown, for example in bold in Table 2 below.

TABLE 2

Example IPv4 MUD URL DHCP

| code | len | MUDstring emergencyUseMUDstring |
|------|-----|-------------------------------------|

Table 2 shows an example for IPv4. An alternative for IPv4 is shown with regards to Table 3 below, which adds a new field for the emergency use MUD string.

TABLE 3

Example IPv4 MUD URL DHCP

| code | total-len (or count) | len | MUDstring1 | len | MUDstring2 |
|------|----------------------|-----|------------|-----|------------|

For IPv6, an option is shown with regards to Table 4 below.

TABLE 4

Example IPv6 MUD URL DHCP

| 0 | | | | | | | | | | | | | | | 1 | | | | | | | | | | | | | | |
|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |

OPTION_MUD_URL_V6  MUDstring  <space> emergencyUseMUDstring

| OPTION_MUD_URL_V6 | option-length |
|-------------------|---------------|
| MUDstring <space> emergencyUseMUDstring | |

The above therefore provides the DHCP option.

For the LLDP option, according to IETF RFC 8520, an LLDP extension was defined to hold MUD URLs. A new subtype could be introduced to vendor-specific event extensions to carry the new emergency MUD string for the emergency use MUD file (or other secondary use MUD file).

An addition to the LLDP vendor-specific frame is shown in bold with regard to Table 5 below.

TABLE 5

Example LLDP vendor-specific frame for eMUDstring

| TLV Type = 127 (7 bits) | len (9 bits) | OUI = 00 00 5E (3 octets) | subtype = 2 (1 octet) | eMUDstring (1-255 octets) |
|-------------------------|--------------|---------------------------|-----------------------|-------------------------------| where:
TLV Type = 127 indicates a vendor-specific TLV
len = indicates the TLV string length
OUI = 00 00 5E is the organizationally unique identifier of IANA
subtype = 2 (as assigned by IANA for the eMUDstring)
eMUDstring = the length MUST NOT exceed 255 octets

From the example of Table 5 above, the subtype actually assigned could be different from 2, but would not be 1 since this is already defined.

For the third case, where the IoT Device (Thing) presents a device certificate that includes a new extension for IEEE 802.1 AR certificates. Such new extension may be defined to signal the presence and possibly location of emergency-use MUD files. Generally, this would involve IETF standardization processes.

Referring to Table 6 below, a new extension follows that defined in the MUD extension. The code is found in section 11 of IETF RFC 8520, and the added extensions are provided in bold in Table 6 below.

TABLE 6

Example extension to IEEE 802.1AR certificates

```
<CODE BEGINS>
MUDURLExtnModule-2016 { iso(1) identified-organization(3) dod(6)
internet(1) security(5) mechanisms(5) pkix(7)
id-mod(0) id-mod-mudURLExtn2016(88) }
DEFINITIONS IMPLICIT TAGS ::= BEGIN
<...>
--
-- Certificate Extensions
--
MUDCertExtensions EXTENSION ::=
{ ext-MUDURL | ext-emMUDURL | ext-MUDsigner, ...}
ext-MUDURL EXTENSION ::=
{ SYNTAX MUDURLSyntax IDENTIFIED BY id-pe-mud-url }
ext-emMUDURL EXTENSION ::=
{ SYNTAX MUDURLSyntax IDENTIFIED BY id-pe-mud-url }
id-pe-mud-url OBJECT IDENTIFIER ::= { id-pe 25 }
MUDURLSyntax ::= IA5String
ext-MUDsigner EXTENSION ::=
{ SYNTAX MUDsignerSyntax IDENTIFIED BY id-pe-mudsigner }
id-pe-mudsigner OBJECT IDENTIFIER ::= { id-pe 30 }
MUDsignerSyntax ::= Name
<...>
```

Alternative embodiments exist for signaling the existence of the emergency or secondary MUD file. In an alternative class of approaches, the MUD manager learns of the need to retrieve the MUD file without advanced signaling from the IoT device that such policy exists.

For example, in one case, the device emits a MUD URL, as currently specified, but the server sends back two separate MUD files, one for routine conditions, and the other for secondary or emergency ones.

In another case, the device may emit one mud URL as currently specified, but the MUD file that is returned from the MUD server to the MUD manager has additional separate entries, such as extensions, for emergency behavior definition. For example, a new field "mud-emergency-url", and/or new "from-device-emergency-policy", "to-device-emergency-policy", or simply "Emergency policy may exist".

In the case where the URL is given, the MUD manager may need to retrieve this file as well, again via https/GET MUD URL. Alternatively, the MUD manager may then need to find the location of the emergency MUD file.

Triggers

With regards to triggers, one issue is how to signal in a MUD file emergency triggering information. Since ACL configuration is highly dependent on firewall implementation, in one case the emergency trigger information signaled in the MUD file is a string for a human user (network administrator) to make use of. However, in other cases it may be in a different, machine readable, form.

Therefore, a new element in the MUD file indicates the triggering of an emergency situation in terms of data that is available to the device. In addition, or alternatively, there could be two trigger elements: one to signal the transition from normal to emergency, and another one to signal the transition from emergency back to normal.

An example of a single triggering element is shown in bold with regards to Table 7 below.

TABLE 7

Example new element in a MUD file

```
module: ietf-mud
+--rw mud!
```

TABLE 7-continued

Example new element in a MUD file

```
  +--rw mud-version uint8
  +--rw mud-url inet:uri
  +--rw last-update yang:date-and-time
  +--rw mud-signature? inet:uri
  +--rw cache-validity? uint8
  +--rw is-supported boolean
  +--rw systeminfo? string
  +--rw mfg-name? string
  +--rw model-name? string
  +--rw firmware-rev? string
  +--rw software-rev? string
  +--rw documentation? inet:uri
  +--rw emergency-trigger? string
  +--rw extensions* string
  +--rw from-device-policy
  | +--rw acls
  | +--rw access-list* [name]
  | +--rw name -> /acl:acls/acl/name
<...>
```

An example showing text to display to the user is provided in Table 7 above.

In the example of Table 8 below, one trigger is for transitioning from a normal operation mode to an emergency operation mode. It is assumed that the same trigger may be used for transitioning from the emergency operation mode to a normal operation mode. Changes are shown in bold.

TABLE 8

Example trigger

```
{
"ietf-mud:mud": {
    "mud-version": 1,
    "mud-url": "https://lighting.example.com/lightbulb2000",
    "last-update": "2019-01-28T11:20:51+01:00",
    "cache-validity": 48,
    "is-supported": true,
    "systeminfo": "The ACME Example Temperature meter",
    "emergency-trigger": "Temperature exceeding 140degrees F.",
    "from-device-policy": {
        "access-lists": {
            "access-list": [
                {
                    "name": "mud-76100-v6fr"
                }
            ]
        }
    }
}
```

Alternatively, two emergency triggers may exist, for example as shown in bold in Table 9 below.

TABLE 9

Example with two emergency triggers

```
{
"ietf-mud:mud": {
    "mud-version": 1,
    "mud-url": "https://lighting.example.com/lightbulb2000",
    "last-update": "2019-01-28T11:20:51+01:00",
    "cache-validity": 48,
    "is-supported": true,
    "systeminfo": "The ACME Example Temperature meter",
    "normal2emergency-trigger": "Temperature exceeding 140degrees F.",
    "emergency2normal-trigger": "Temperature below 130 degrees F.",
    "from-device-policy": {
        "access-lists": {
            "access-list": [
```

TABLE 9-continued

Example with two emergency triggers

```
            {
              "name": "mud-76100-v6fr"
            }
          ]
        }
}
```

While the above the signaling is focused on the emergency use case, similar amendments could be made to such signaling for any other secondary use case for an Internet of Things device. The present disclosure is therefore not limited to emergency use cases.

Hardware

The servers, IoT devices, gateways, relays, switches, MUD managers, Ownership Trackers, ESInet lookups, MASA servers, MUDS servers, and electronic devices performing the methods described above may be any electronic device or network node. Such electronic device or network node may include any type of computing device, including but not limited to, mobile devices such as smartphones or cellular telephones. Examples can further include fixed or mobile user equipments, such as IoT devices, endpoints, home automation devices, medical equipment in hospital or home environments, inventory tracking devices, environmental monitoring devices, energy management devices, infrastructure management devices, vehicles or devices for vehicles, fixed electronic devices, among others. Vehicles includes motor vehicles (e.g., automobiles, cars, trucks, buses, motorcycles, etc.), aircraft (e.g., airplanes, unmanned aerial vehicles, unmanned aircraft systems, drones, helicopters, etc.), spacecraft (e.g., spaceplanes, space shuttles, space capsules, space stations, satellites, etc.), watercraft (e.g., ships, boats, hovercraft, submarines, etc.), railed vehicles (e.g., trains and trams, etc.), pedestrians and bicycles and other types of vehicles including any combinations of any of the foregoing, whether currently existing or after arising.

Figure 16:
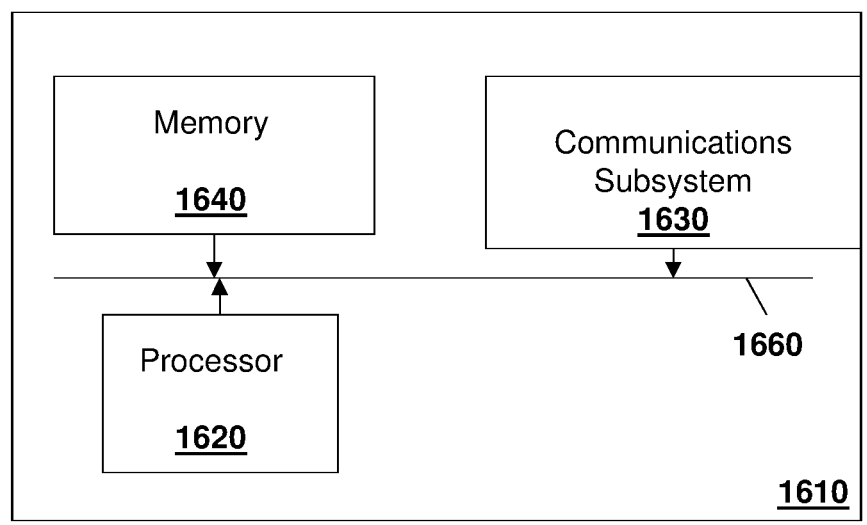
FIG. 16 is a block diagram of a simplified electronic device capable of being used with the methods and systems herein according to one embodiment.

One simplified diagram of a network element or an electronic device is shown with regard to FIG. 16.

In FIG. 16, device 1610 includes a processor 1620 and a communications subsystem 1630, where the processor 1620 and communications subsystem 1630 cooperate to perform the methods of the embodiments described above. Communications subsystem 1620 may, in some embodiments, comprise multiple subsystems, for example for different radio and wired technologies.

The processor 1620 is configured to execute programmable logic, which may be stored, along with data, on device 1610, and shown in the example of FIG. 16 as memory 1640. Memory 1640 can be any tangible, non-transitory computer readable storage medium. The computer readable storage medium may be a tangible or in transitory/non-transitory medium such as optical (e.g., CD, DVD, etc.), magnetic (e.g., tape), flash drive, hard drive, or other memory known in the art.

Alternatively, or in addition to memory 1640, device 1610 may access data or programmable logic from an external storage medium, for example through communications subsystem 1630.

The communications subsystem 1630 allows device 1610 to communicate with other devices or network elements and may vary based on the type of communication being performed. Further, communications subsystem 1630 may comprise a plurality of communications technologies, including any wired or wireless communications technology.

Communications between the various elements of device 1610 may be through an internal bus 1660 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps is not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly a plurality of nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method at a network element for configuration for Internet of Things (IoT) devices using manufacturer usage description (MUD) files, the method comprising:
   receiving at least one MUD Uniform Resource Locator (URL) from an IoT Device;
   sending, from the network element to at least one MUD Server based on the MUD URL, a Uniform Resource Indicator;
   responsive to the sending, receiving a plurality of MUD files from the MUD server;
   creating a plurality of policies from the plurality of MUD files, the plurality of policies corresponding to a normal mode of operation and a secondary mode of operation, the normal mode of operation being associated to a first set of contact information and the second mode of operation being associated to a second set of contact information;
   forwarding the plurality of policies to a gateway from the network element; wherein the receiving the plurality of MUD files comprises receiving at least one trigger, the at least one trigger defining a condition for transitioning into the second mode of operation; and
   performing a lookup for the second set of contact information based on a geographic location of the IoT device, the second set of contact information comprising an identifier, network address or location for a secondary network.

2. The method of claim 1, wherein the receiving at least one MUD URL comprises receiving a first MUD URL and a second MUD URL from the IoT Device; and
   wherein the sending comprises sending the Uniform Resource Indicator to a first MUD server based on the first MUD URL and a second MUD server based on the second MUD URL.

3. The method of claim 1, wherein the receiving the at least one MUD URL comprises receiving a single MUD URL; and
   wherein the receiving the plurality of MUD files comprises receiving two MUD files.

4. The method of claim 1, wherein the receiving the at least one MUD URL comprises receiving a single MUD URL; and
   wherein the receiving the plurality of MUD files comprises:
     receiving a first MUD file and an extension within the first MUD file;
     extracting the extension from the first MUD file; and
     retrieving a second MUD file based on the extension.

5. The method of claim 1, further comprising forwarding the trigger to one of an application server and the gateway.

6. The method of claim 1, further comprising forwarding the contact information to the IoT device and the gateway from the network element.

7. The method of claim 1, wherein the secondary mode of operation is an emergency services mode of operation.

8. A network element for configuration for Internet of Things (IoT) devices using manufacturer usage description (MUD) files, the network element comprising:
   a processor; and
   a communications subsystem,
wherein the network element is configured to:
   receive at least one MUD Uniform Resource Locator (URL) from an IoT Device;
   send to at least one MUD Server based on the MUD URL a Uniform Resource Indicator;
   responsive to sending the Uniform Resource Indicator, receive a plurality of MUD files from the MUD server;
   create a plurality of policies from the plurality of MUD files, the plurality of policies corresponding to a normal mode of operation and a secondary mode of operation, the normal mode of operation being associated to a first set of contact information and the second mode of operation being associated to a second set of contact information;
   forward the plurality of policies to a gateway from the network element; wherein the receiving the plurality of MUD files comprises receiving at least one trigger, the at least one trigger defining a condition for transitioning into the second mode of operation; and
   perform a lookup for the second set of contact information based on a geographic location of the IoT device, the second set of contact information comprising an identifier, network address or location for a secondary network.

9. The network element of claim 8, wherein the network element is configured to receive at least one MUD URL by receiving a first MUD URL and a second MUD URL from the IoT Device; and
   wherein the network element is configured to send by sending the Uniform Resource Indicator to a first MUD server based on the first MUD URL and a second MUD server based on the second MUD URL.

10. The network element of claim 8, wherein the network element is configured to receive the at least one MUD URL by receiving a single MUD URL; and
   wherein the network element is configured to receive the plurality of MUD files by receiving two MUD files.

11. The network element of claim 8, wherein the network element is configured to receive the at least one MUD URL by receiving a single MUD URL; and
  wherein the network element is configured to receive the plurality of MUD files by:
    receiving a first MUD file and an extension within the first MUD file;
    extracting the extension from the first MUD file; and
    retrieving a second MUD file based on the extension.

12. The network element of claim 8, wherein the network element is further configured to forward the trigger to one of an application server and the gateway.

13. The network element of claim 8, wherein the network element is further configured to forward the contact information to the IoT device and the gateway from the network element.

14. The network element of claim 8, wherein the secondary mode of operation is an emergency services mode of operation.

15. A non-transitory computer readable medium for storing instruction code for configuration for Internet of Things (IoT) devices using manufacturer usage description (MUD) files, which when executed by a processor of a network element cause the network element to:

receive at least one MUD Uniform Resource Locator (URL) from an IoT Device;
  send to at least one MUD Server based on the MUD URL a Uniform Resource Indicator;
  responsive to sending the Uniform Resource Indicator, receive a plurality of MUD files from the MUD server;
  create a plurality of policies from the plurality of MUD files, the plurality of policies corresponding to a normal mode of operation and a secondary mode of operation, the normal mode of operation being associated to a first set of contact information and the second mode of operation being associated to a second set of contact information;
  forward the plurality of policies to a gateway from the network element; wherein the receiving the plurality of MUD files comprises receiving at least one trigger, the at least one trigger defining a condition for transitioning into the second mode of operation; and
  perform a lookup for the second set of contact information based on a geographic location of the IoT device, the second set of contact information comprising an identifier, network address or location for a secondary network.

* * * * *